(12) United States Patent
Oh et al.

(10) Patent No.: US 10,330,990 B2
(45) Date of Patent: Jun. 25, 2019

(54) LIQUID CRYSTAL DISPLAY DEVICE

(71) Applicant: Samsung Display Co. Ltd., Yongin-si (KR)

(72) Inventors: Ho Kil Oh, Seoul (KR); Hoon Kim, Ansan-si (KR); Ki Chul Shin, Seongnam-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/802,196

(22) Filed: Nov. 2, 2017

(65) Prior Publication Data

US 2018/0157131 A1   Jun. 7, 2018

(30) Foreign Application Priority Data

Dec. 5, 2016 (KR) .................. 10-2016-0164346

(51) Int. Cl.
  *G02F 1/1335* (2006.01)
  *G02F 1/1343* (2006.01)
  *G02F 1/1362* (2006.01)

(52) U.S. Cl.
  CPC .. *G02F 1/134309* (2013.01); *G02F 1/133512* (2013.01); *G02F 2001/134345* (2013.01); *G02F 2001/136218* (2013.01); *G02F 2201/121* (2013.01); *G02F 2201/123* (2013.01)

(58) Field of Classification Search
  CPC ................. G02F 1/134309; G02F 1/133515
  See application file for complete search history.

(56) References Cited

U.S. PATENT DOCUMENTS

| 9,069,196 B2 | 6/2015 | Yun et al. | |
| 2010/0001276 A1* | 1/2010 | Kim | G02F 1/136227 257/59 |
| 2015/0268515 A1 | 9/2015 | Seo et al. | |
| 2016/0238908 A1* | 8/2016 | Kim | G02F 1/134336 |
| 2016/0246132 A1 | 8/2016 | Cho et al. | |

FOREIGN PATENT DOCUMENTS

| KR | 1020130104830 | 9/2013 |
| KR | 1020150111396 | 10/2015 |
| KR | 1020160104172 | 9/2016 |

* cited by examiner

*Primary Examiner* — James A Dudek
(74) *Attorney, Agent, or Firm* — Cantor Colburn LLP

(57) ABSTRACT

A liquid crystal display device includes a first substrate, a pixel electrode which is disposed on the first substrate and comprises a first sub-pixel electrode and a second sub-pixel electrode adjacent to the first sub-pixel electrode along a first direction, and a shielding electrode which is disposed on the same layer as the pixel electrode and comprises a first area having a first width and a second area having a second width which is smaller than the first width along a second direction which crosses the first direction, and the first sub-pixel electrode may be adjacent to the first area along the second direction, and the second sub-pixel electrode may be adjacent to the second area along the second direction.

19 Claims, 22 Drawing Sheets

LIQUID CRYSTAL DISPLAY DEVICE

This application claims priority to Korean Patent Application No. 10-2016-0164346, filed on Dec. 5, 2016, all the benefits accruing therefrom under 35 U.S.C. § 119, the content of which in its entirety is herein incorporated by reference.

BACKGROUND

1. Field

Exemplary embodiments of the invention relate to a liquid crystal display ("LCD") device.

2. Description of the Related Art

An LCD device is one of the most widely used types of flat panel display devices. Generally, the LCD device includes a pair of substrates having field generating electrodes, such as pixel electrodes and a common electrode, and a liquid crystal layer disposed between the two substrates. In the LCD device, generally, voltages are applied to the field generating electrodes to generate an electric field in the liquid crystal layer. Accordingly, the direction of liquid crystal molecules of the liquid crystal layer is determined, and polarization of incident light is controlled by the generated electric field. As a result, a desired image is displayed on the LCD device.

Among various types of LCD devices, an LCD device with a vertically aligned ("VA") mode, in which long axes of liquid crystals are aligned perpendicular to upper and lower display panels when no electric field is applied, is drawing a lot of attention due to a high contrast ratio and a wide reference viewing angle.

SUMMARY

Exemplary embodiments of the invention are directed to a liquid crystal display ("LCD") device having improved lateral visibility with minimized reduction in aperture ratio.

However, exemplary embodiments of the invention are not restricted to the one set forth herein. The above and other features of the exemplary embodiments of the invention will become more apparent to one of ordinary skill in the art to which the exemplary embodiments of the invention pertains by referencing the detailed description.

An exemplary embodiment discloses a liquid crystal display device comprising a first substrate, a pixel electrode which is disposed on the first substrate and comprises a first sub-pixel electrode and a second sub-pixel electrode adjacent to the first sub-pixel electrode along a first direction, and a shielding electrode which is disposed on the same layer as the pixel electrode and comprises a first area having a first width and a second area having a second width which is smaller than the first width along a second direction which crosses the first direction. The first sub-pixel electrode may be adjacent to the first area along the second direction, and the second sub-pixel electrode may be adjacent to the second area along the second direction.

An exemplary embodiment also discloses an LCD device comprising a first substrate, a pixel electrode which is disposed on the first substrate and comprises a first sub-pixel electrode and a second sub-pixel electrode adjacent to the first sub-pixel electrode in a first direction, a second substrate which faces the first substrate, and a black matrix which is disposed on the second substrate. The black matrix may do not overlap the first sub-pixel electrode and at least partially overlap the second sub-pixel electrode in a direction perpendicular to a major surface plane defining the first substrate.

It is to be understood that both the foregoing general description and the following detailed description are exemplary and explanatory and are intended to provide further explanation of the invention as claimed.

BRIEF DESCRIPTION OF THE DRAWINGS

The above and/or other advantages and features of this disclosure will become apparent and more readily appreciated from the following description of the embodiments, taken in conjunction with the accompanying drawings in which.

DETAILED DESCRIPTION

Figure 1:
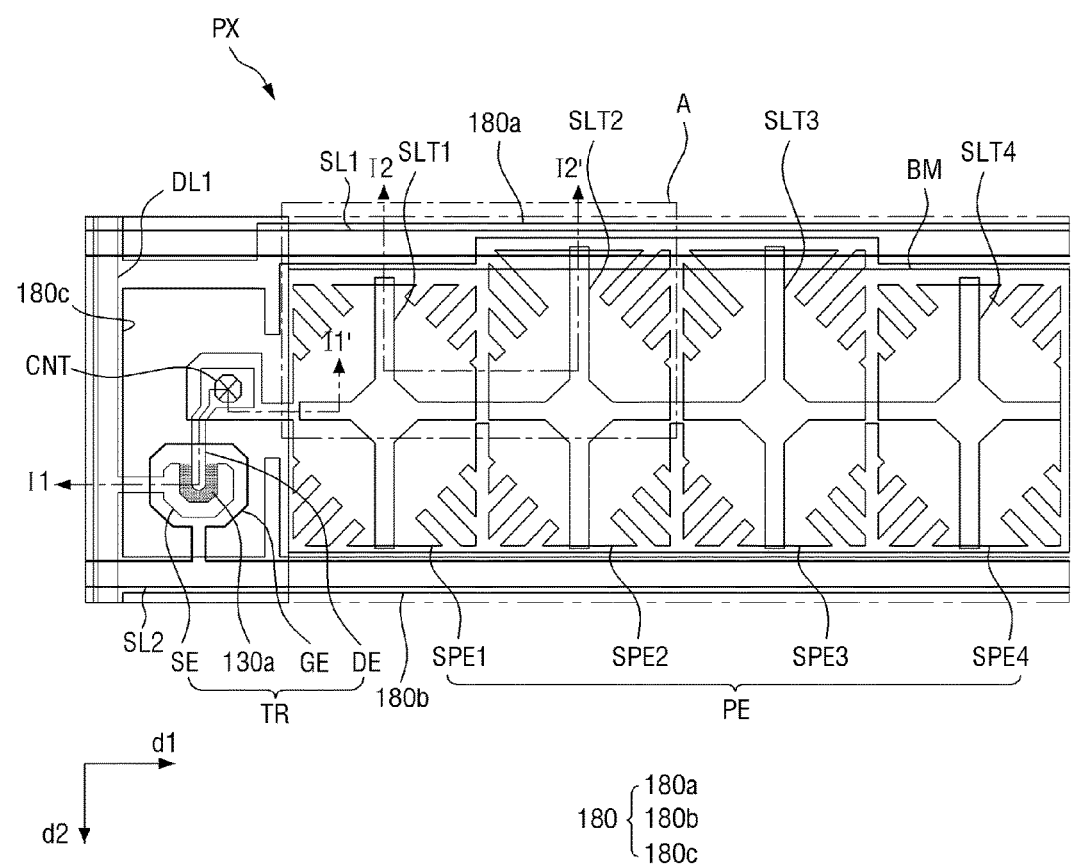
FIG. 1 is a schematic plan view of an exemplary embodiment of a pixel included in a liquid crystal display ("LCD") device.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. As used herein, connected may refer to elements being physically and/or electrically connected to each other." For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. "Or" means "and/or." As used herein, the term "and/or" includes any and all combinations of one or more of the associated listed items.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region provided by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described with reference to the accompanying drawings.

FIG. 1 is a schematic plan view of an exemplary embodiment of a pixel included in a liquid crystal display ("LCD") device. In FIG. 1, a black matrix BM is illustrated with only the boundary line thereof such that the black matrix BM can be distinguished from other elements.

Referring to FIG. 1, an LCD device according to an exemplary embodiment may include a pixel PX, a common electrode CE (refer FIG. 7), a shielding electrode 180, a first scan line SL1, a second scan line SL2, a first data line DL1, and the black matrix BM.

The first scan line SL1 and the second scan line SL2 may extend in a first direction d1. The first data line DL1 may extend in a second direction d2. In an exemplary embodiment, the first direction d1 may cross the second direction d2. In FIG. 1, for example, the first direction d1 is a row direction of the LCD device, and the second direction d2 is a column direction of the LCD device. For ease of description, a scan line located above a pixel electrode PE will be referred to as the first scan line SL1, and a scan line located under the pixel electrode PE will be referred to as the second scan line SL2.

The pixel PX may include a switching device TR and the pixel electrode PE. In an exemplary embodiment, the switching device TR may be a three-terminal device such as a thin-film transistor ("TFT"). Hereinafter, a case where the switching device TR is a TFT will be described as an example.

The switching device TR may have a gate electrode GE electrically connected to the second scan line SL2 and a source electrode SE electrically connected to the first data line DL1. In addition, a drain electrode DE of the switching device TR may be electrically connected to the pixel electrode PE.

The switching device TR may perform a switching operation, according to a scan signal received from the second scan line SL2, thereby providing a data signal received from the first data line DL1 to the pixel electrode PE. Although a case where the gate electrode GE of the switching device TR is electrically connected to the second scan line SL2 is described herein as an example, the gate electrode GE of the switching device TR can also be electrically connected to the first scan line SL1 instead of the second scan line SL2 in another exemplary embodiment.

In an exemplary embodiment, the pixel electrode PE may extend further in the first direction d1 than in the second direction d2. The pixel electrode PE includes at least two sub-pixel electrodes. Here, one of the two sub-pixel electrodes overlaps the black matrix BM in a direction perpendicular to a major surface plane defining a lower substrate 110 (refer FIG. 7), and the other sub-pixel electrode does not overlap the black matrix BM in the direction perpendicular to the major surface plane defining the lower substrate 110. Hereinafter, a case where the pixel electrode PE includes first through fourth sub-pixel electrodes SPE1 through SPE4 will be described as an example.

The first through fourth sub-pixel electrodes SPE1 through SPE4 may be arranged in the first direction d1 with an order of the first through fourth sub-pixel electrodes SPE1 through SPE4. Each of the first through fourth sub-pixel electrodes SPE1 through SPE4 may be directly connected to one or two of the other sub-pixel electrodes. Each of the first through fourth sub-pixel electrodes SPE1 through SPE4 may include a plate portion and branch portions.

Here, at least part of each of the first sub-pixel electrode SPE1 and the fourth sub-pixel electrode SPE4 may not overlap the black matrix BM in the direction perpendicular to the major surface plane defining the lower substrate 110. In addition, each of the second sub-pixel electrode SPE2 and the third sub-pixel electrode SPE3 may overlap the black matrix BM in the direction perpendicular to the major surface plane defining the lower substrate 110. The shapes of the first through fourth sub-pixel electrodes SPE1 through SPE4 will be described later with reference to FIGS. 4 to 6.

In an exemplary embodiment, a shielding electrode 180 may overlap at least one of the first scan line SL1, the second scan line SL2, and the first data line DL1 in the direction perpendicular to the major surface plane defining the lower substrate 110. The shielding electrode 180 may block coupling between the pixel electrode PE and at least one of the first scan line SL1, the second scan line SL2 and the first data line DL1. The shape of the shielding electrode 180 will be described later with reference to FIGS. 4 and 5.

The common electrode CE (refer FIG. 7) may define a plurality of slit portions. Here, the slit portions may include first through fourth slit portions SLT1 through SLT4 corresponding to the first through fourth sub-pixel electrodes SPE1 through SPE4. The common electrode CE will be described later with reference to FIG. 6.

Figure 2:
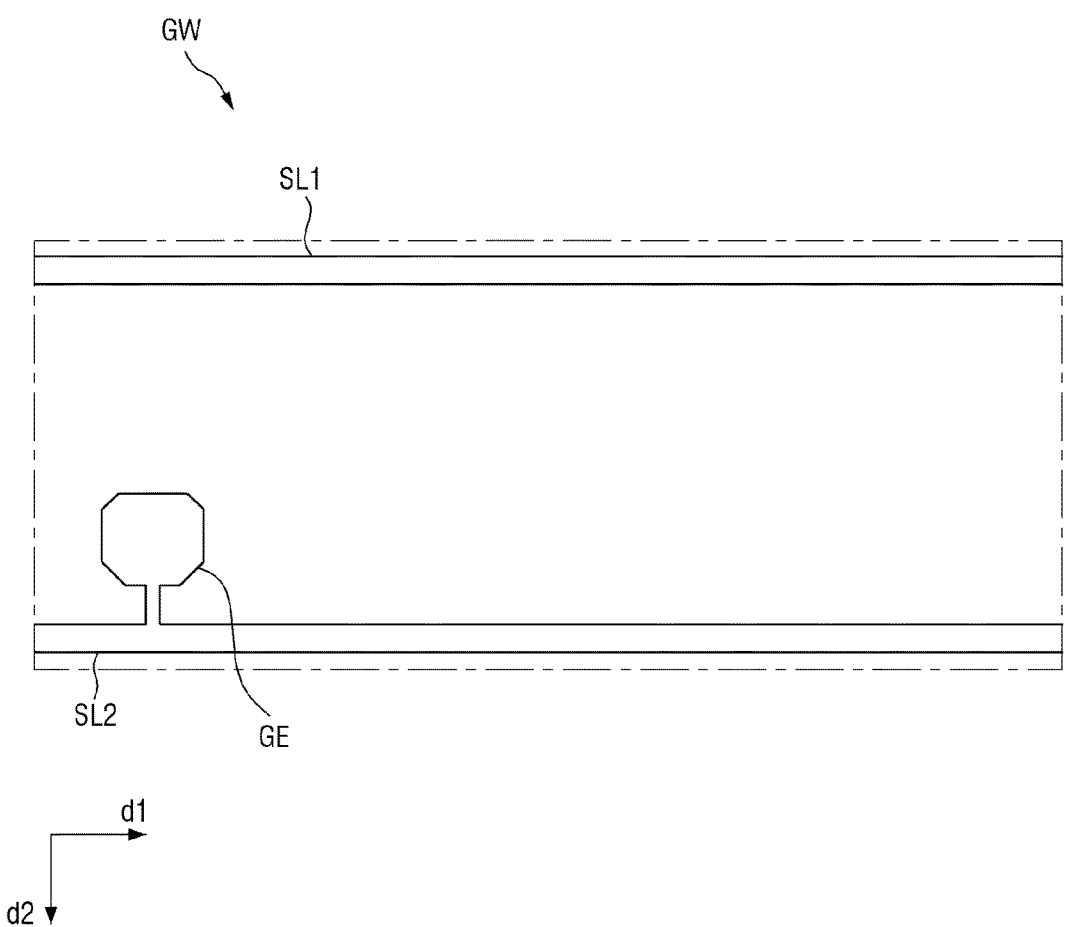
FIG. 2 is a plan view of an exemplary embodiment of a gate conductor illustrated in FIG. 1.
Figure 3:
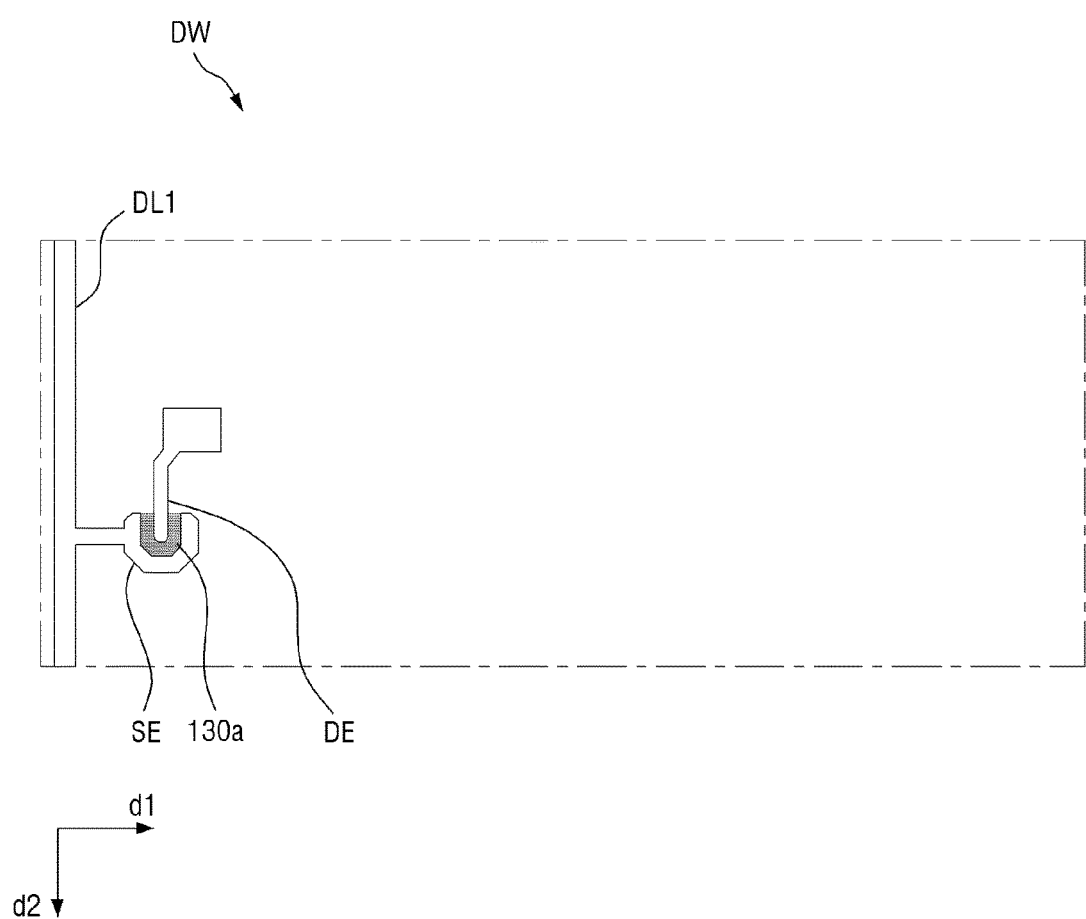
FIG. 3 is a plan view of an exemplary embodiment of a data conductor illustrated in FIG. 1.
Figure 4:
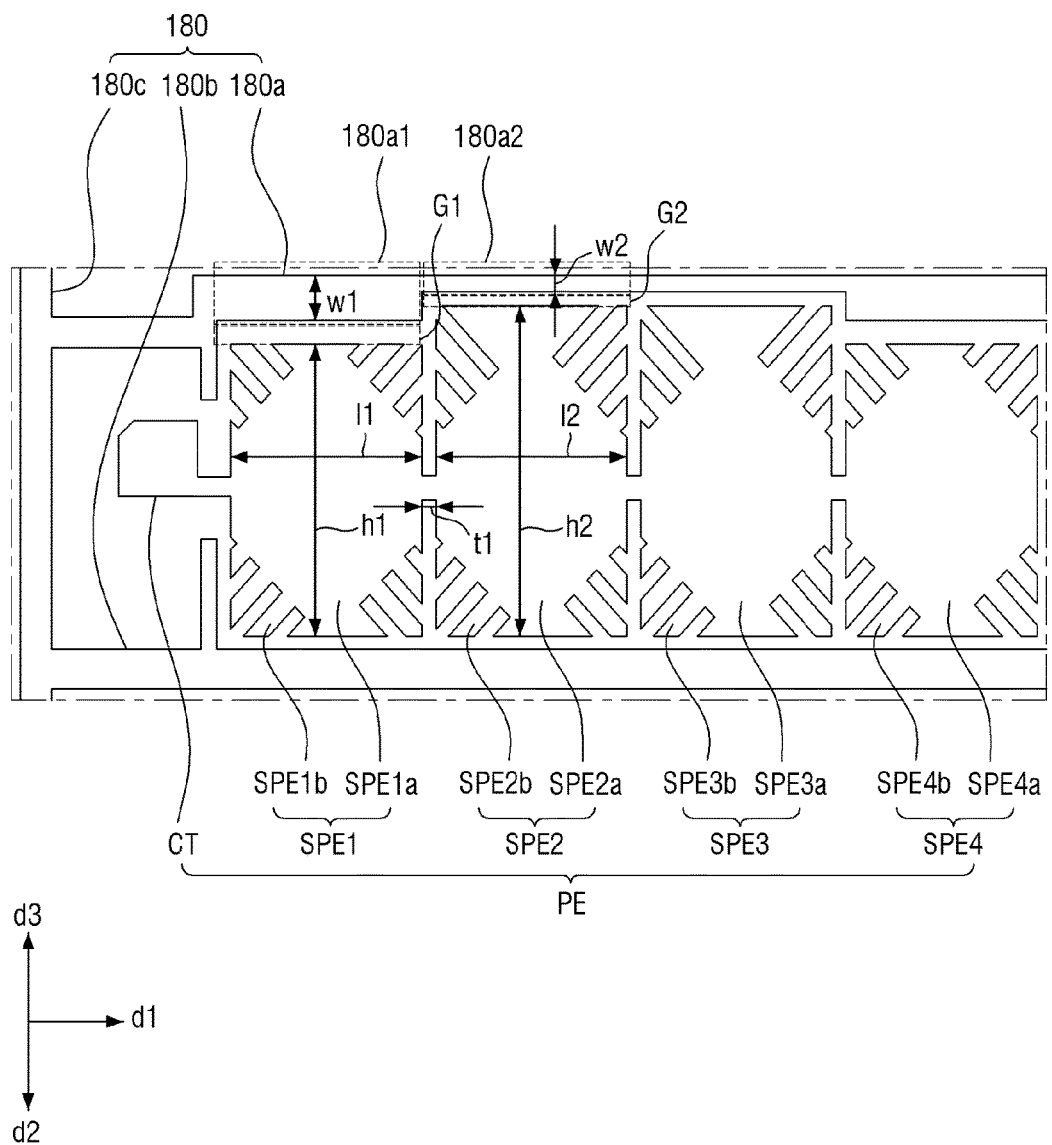
FIG. 4 is a plan view of an exemplary embodiment of a pixel electrode and a shielding electrode illustrated in FIG. 1.
Figure 5:
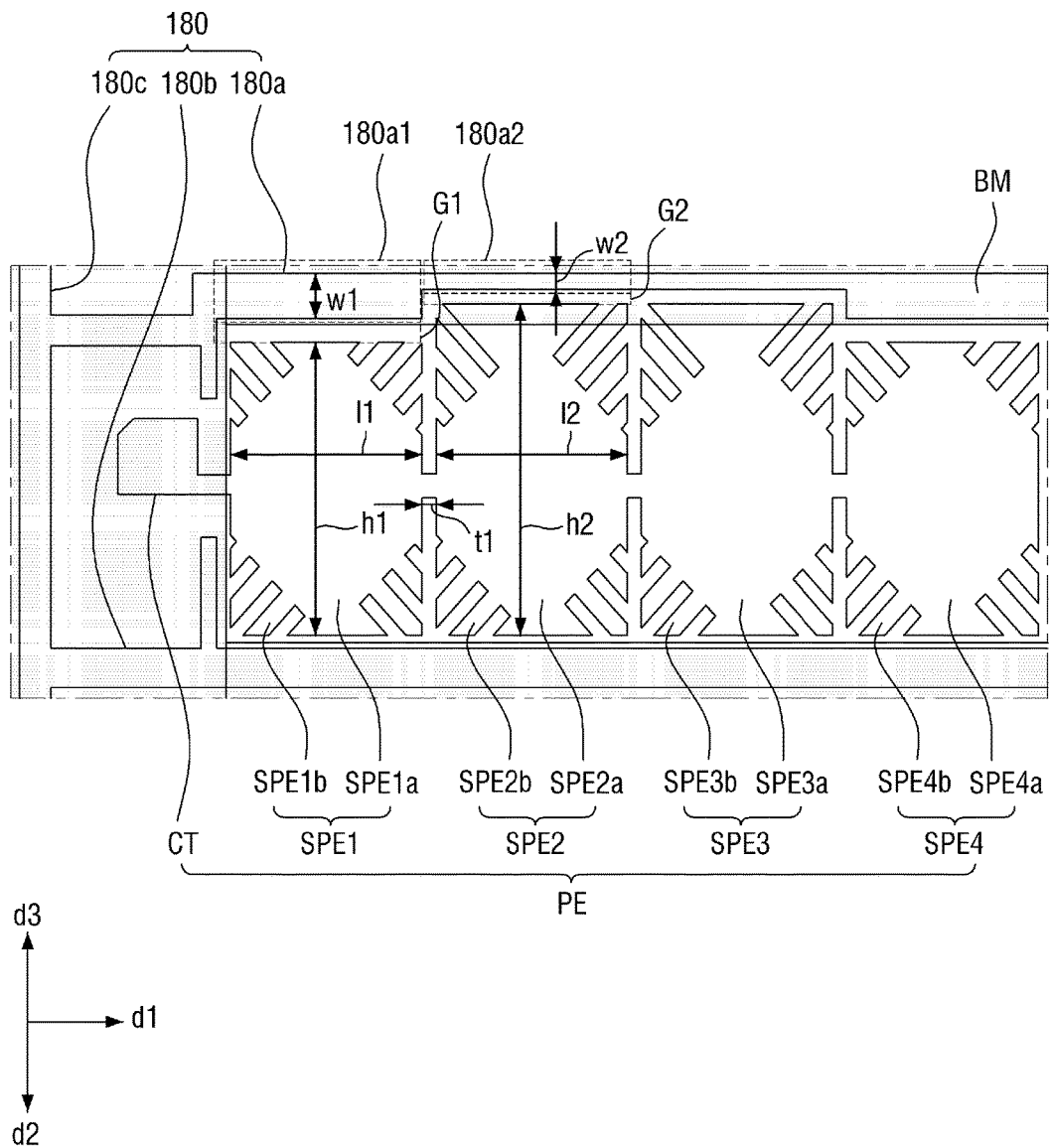
FIG. 5 is a plan view of an exemplary embodiment of the pixel electrode, the shielding electrode and a black matrix illustrated in FIG. 1.
Figure 6:
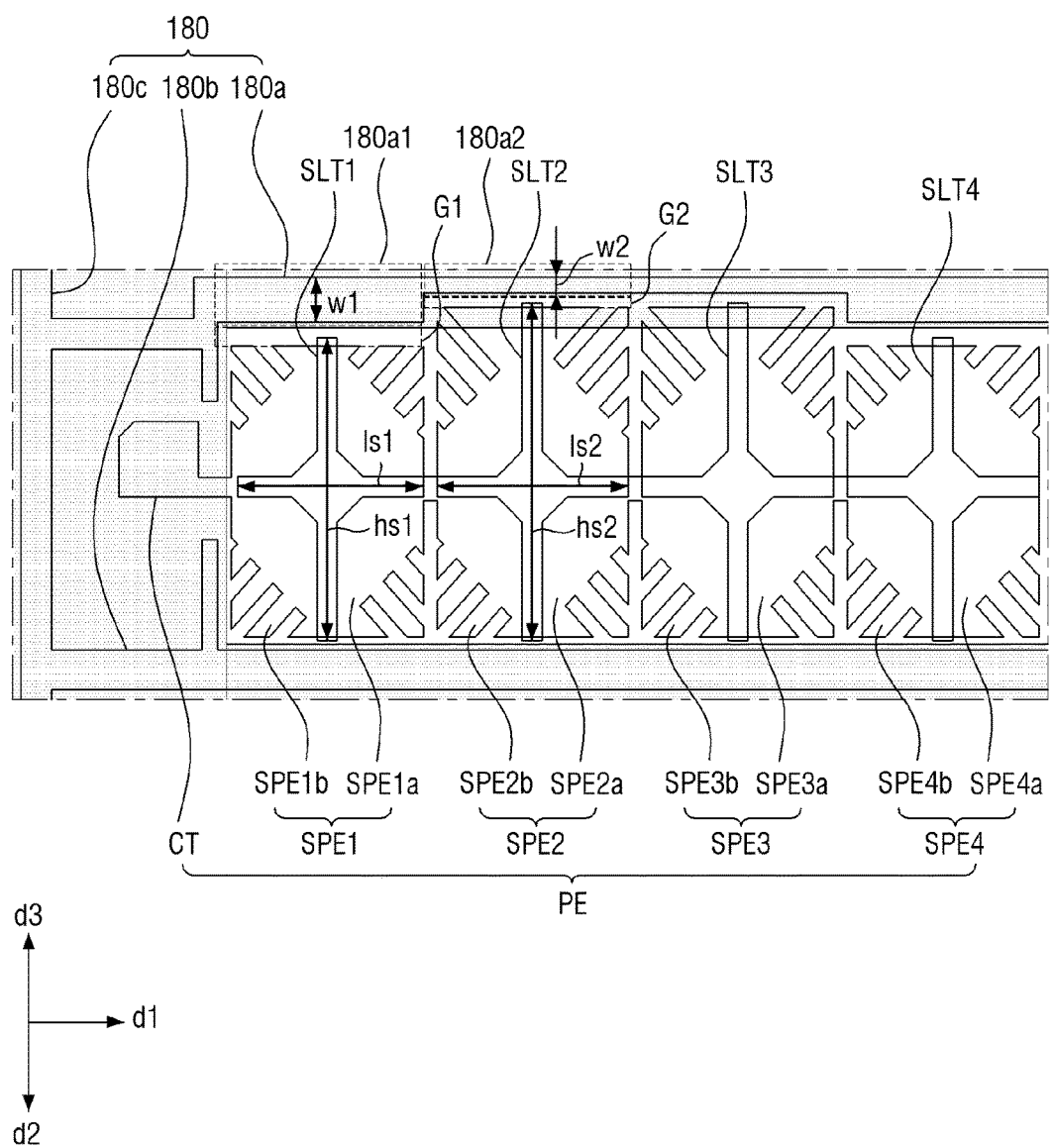
FIG. 6 is a plan view of an exemplary embodiment of a common electrode illustrated in FIG. 1.
Figure 7:
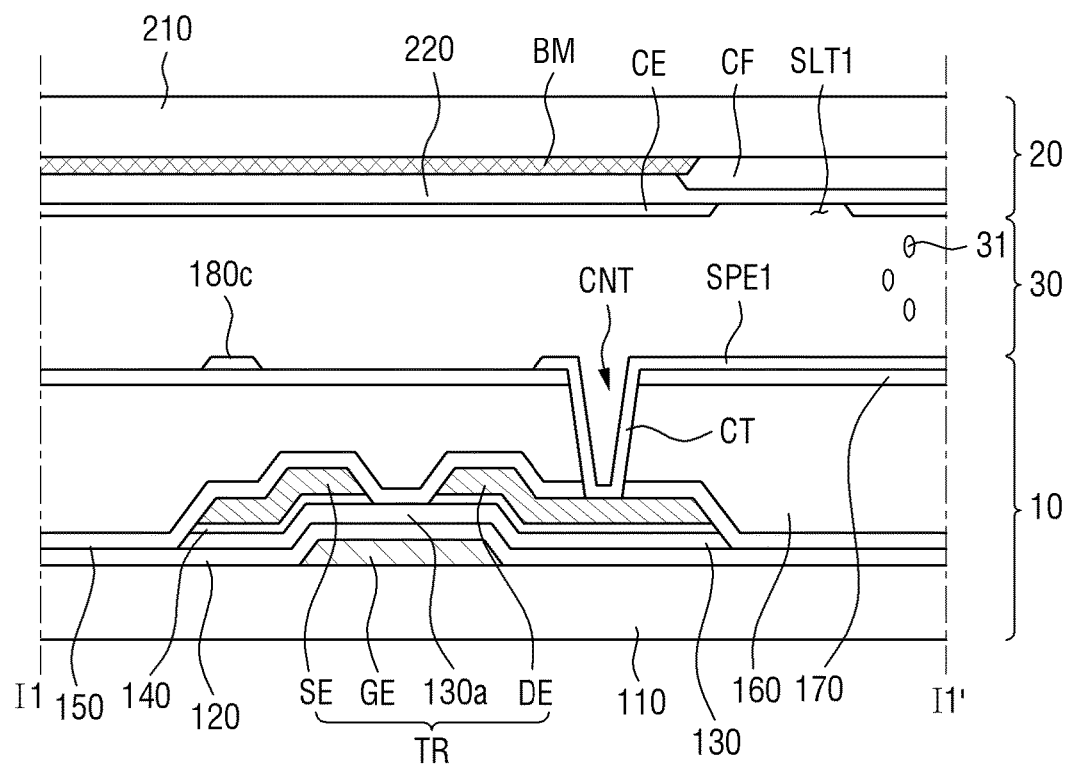
FIG. 7 is a cross-sectional view taken along line I1-I1' of FIG. 1.
Figure 8:
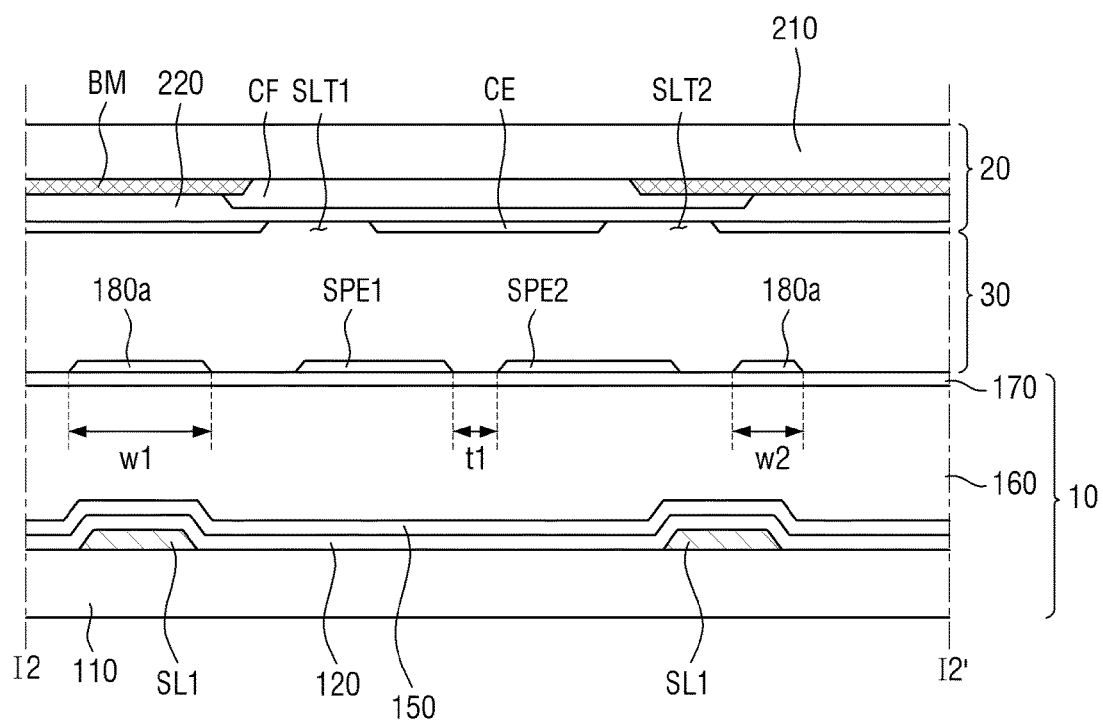
FIG. 8 is a cross-sectional view taken along line I2-I2' of FIG. 1.

FIG. 2 is a plan view of an exemplary embodiment of a gate conductor GW illustrated in FIG. 1. FIG. 3 is a plan view of an exemplary embodiment of a data conductor DW illustrated in FIG. 1. FIG. 4 is a plan view of an exemplary embodiment of the pixel electrode PE and the shielding electrode 180 illustrated in FIG. 1. FIG. 5 is a plan view of an exemplary embodiment of the pixel electrode PE, the shielding electrode 180 and the black matrix BM illustrated in FIG. 1. FIG. 6 is a plan view of an exemplary embodiment of the common electrode CE illustrated in FIG. 1. FIG. 7 is a cross-sectional view taken along line I1-I1' of FIG. 1. FIG. 8 is a cross-sectional view taken along line I2-I2' of FIG. 1.

Referring to FIGS. 2 through 8, a lower display panel 10 may be placed to face an upper display panel 20. A liquid crystal layer 30 may be interposed between the lower display panel 10 and the upper display panel 20. The liquid crystal layer 30 may include a plurality of liquid crystal molecules 31. In an exemplary embodiment, the lower display panel 10 may be bonded to the upper display panel 20 by sealing.

Hereinafter, the lower display panel 10 will be described.

In an exemplary embodiment, the lower substrate 110 may be a transparent insulating substrate. In an exemplary embodiment, the transparent insulating substrate may be a glass substrate, a quartz substrate, a transparent resin substrate, or the like. In an exemplary embodiment, the lower substrate 110 may be flexible.

The gate conductor GW may be disposed on the lower substrate 110. The gate conductor GW may include the gate electrode GE and a plurality of scan lines including the first scan line SL1 and the second scan line SL2. The first scan line SL1 may extend on the lower substrate 110 along the first direction d1. The first scan line SL1 may be adjacent to the second scan line SL2.

The gate electrode GE may be disposed on the lower substrate 110 and connected to the second scan line SL2. The gate electrode GE may branch from the second scan line SL2. The gate electrode GE is one element of the switching device TR.

In an exemplary embodiment, the gate conductor GW may be a single layer, a double layer or a triple layer made of one conductive metal, at least two conductive metals or three conductive metals selected from aluminum (Al), copper (Cu), molybdenum (Mo), chrome (Cr), titanium (Ti), tungsten (W), molybdenum tungsten (MoW), molybdenum titanium (MoTi), and copper/molybdenum titanium (Cu/MoTi), for example. In an exemplary embodiment, the elements of the gate conductor GW may be disposed simultaneously by the same mask process, for example.

A gate insulating layer 120 may be disposed on the gate conductor GW. In an exemplary embodiment, the gate insulating layer 120 may be made of silicon nitride (SiNx) or silicon oxide (SiOx), for example. In an exemplary embodiment, the gate insulating layer 120 may also have a multilayer structure composed of at least two insulating layers with different physical characteristics.

The data conductor DW may be disposed on the gate insulating layer 120. The data conductor DW may include a semiconductor layer 130, the first data line DL1, the source electrode SE, and the drain electrode DE.

The semiconductor layer 130 may include a channel area 130a which forms a channel of the switching device TR. In an exemplary embodiment, the semiconductor layer 130 may include amorphous silicon or polycrystalline silicon, for example. In addition, the semiconductor layer 130 may include an oxide semiconductor. In an exemplary embodiment, the oxide semiconductor may be one of In—Ga-Zinc-Oxide (IGZO), ZnO, $ZnO_2$, CdO, SrO, $SrO_2$, CaO, $CaO_2$, MgO, MgO$_2$, InO, In$_2$O$_2$, GaO, Ga$_2$O, Ga$_2$O$_3$, SnO, SnO$_2$, GeO, GeO$_2$, PbO, Pb$_2$O$_3$, Pb$_3$O$_4$, TiO, TiO$_2$, Ti$_2$O$_3$, and Ti$_3$O$_5$, for example.

The data conductor DW may further include an ohmic contact layer 140. The ohmic contact layer 140 may be disposed on the semiconductor layer 130. In an exemplary embodiment, the ohmic contact layer 140 may be made of a material such as n+ hydrogenated amorphous silicon heavily doped with an n-type impurity such as phosphorous or may be made of silicide. When the semiconductor layer 130 is made of an oxide semiconductor, the ohmic contact layer 140 may be omitted.

The first data line DL1, the source electrode SE and the drain electrode DE may be disposed on the gate insulating layer 120 and the ohmic contact layer 140. The first data line DL1 may extend on the lower substrate 110 along the second direction d2.

The source electrode SE may branch from the first data line DL1, and at least part of the source electrode SE may overlap the gate electrode GE in the direction perpendicular to the major surface plane defining the lower substrate 110. The drain electrode DE may overlap the gate electrode GE in the direction perpendicular to the major surface plane defining the lower substrate 110 and may be separated from the source electrode SE by a predetermined distance. In FIG. 1, the source electrode SE is U-shaped, and the drain electrode DE is surrounded by the source electrode SE, for example. However, the arrangements of the source electrode SE and the drain electrode DE are not limited to this example.

The source electrode SE and the drain electrode DE form the switching device TR together with the channel area 130$a$ of the semiconductor layer 130 and the gate electrode GE. The source electrode SE of the switching device TR may be connected to the first data line DL1. The drain electrode DE of the switching device TR may be connected to the pixel electrode PE via a contact hole CNT.

In an exemplary embodiment, the data conductor DW may be a single layer, a double layer or a triple layer made of one conductive metal, at least two conductive metals or three conductive metals selected from aluminum (Al), copper (Cu), molybdenum (Mo), chrome (Cr), titanium (Ti), tungsten (W), molybdenum tungsten (MoW), molybdenum titanium (MoTi), and copper/molybdenum titanium (Cu/MoTi), for example. However, the material that forms the data conductor DW is not limited to the above examples, and the data conductor DW can be made of various metals or conductors. In an exemplary embodiment, the elements of the data conductor DW may be disposed simultaneously by the same mask process, for example. In an exemplary embodiment, the first data line DL1, the source electrode SE and the drain electrode DE may have substantially the same shape as the semiconductor layer 130 except for the channel area 130$a$.

A first passivation layer 150 may be disposed on the first data line DL1, the source electrode SE, and the drain electrode DE. In an exemplary embodiment, the first passivation layer 150 may be made of an inorganic insulating material such as silicon nitride or silicon oxide. The first passivation layer 150 may prevent a pigment of an organic insulating layer 160, which will be described later, from flowing into the channel area 130$a$.

The organic insulating layer 160 may be disposed on the first passivation layer 150. The organic insulating layer 160 may include an organic material having relatively superior planarization characteristics and photosensitivity. The organic insulating layer 160 may be a color filter in an exemplary embodiment, when the organic insulating layer 160 is a color filter, it may display one of three primary colors such as red, green, and blue. Furthermore, a color filter CF disposed on the upper display panel 20 to be described later may be omitted. In an alternative embodiment, the organic insulating layer 160, instead of the color filter CF, may be omitted. Hereinafter, a case where the organic insulating layer 160 is not a color filter will be described as an example.

A second passivation layer 170 may be disposed on the organic insulating layer 160. In an exemplary embodiment, the second passivation layer 170 may be made of an inorganic insulating material such as silicon nitride or silicon oxide. In an exemplary embodiment, the second passivation layer 170 may prevent the organic insulating layer 160 from being lifted and prevent the liquid crystal layer 30 from being contaminated by a substance such as a solvent flowing from the organic insulating layer 160.

The contact hole CNT which exposes at least part of the drain electrode DE may be defined in the first passivation layer 150, the organic insulating layer 160 and the second passivation layer 170.

The pixel electrode PE may be disposed on the second passivation layer 170. In an exemplary embodiment, the pixel electrode PE may be made of a transparent conductive material such as indium tin oxide ("ITO") or indium zinc oxide ("IZO") or a reflective metal such as aluminum, silver, chrome or an alloy of these metals, for example. The pixel electrode PE contacts the drain electrode DE through the contact hole CNT.

Hereinafter, the shape of the pixel electrode PE will be described in detail with reference to FIGS. 1 through 4.

The pixel electrode PE may include a contact portion CT and the first through fourth sub-pixel electrodes SPE1 through SPE4 which are connected to the contact portion CT.

The contact portion CT is defined as an area of the pixel electrode PE, which contacts the exposed drain electrode DE directly through the contact hole CNT. The contact portion CT is directly connected to the first sub-pixel electrode SPE1. Accordingly, the contact portion CT electrically and physically connects the drain electrode DE and the first sub-pixel electrode SPE1.

The first sub-pixel electrode SPE1 may include a first plate portion SPE1$a$ and a plurality of first branch portions SPE1$b$. In an exemplary embodiment, the first plate portion SPE1$a$ may have a rhombic plate shape, for example. Here, the plate shape refers to a single unitary indivisible plate shape. The first branch portions SPE1$b$ may extend from the first plate portion SPE1$a$. In an exemplary embodiment, the first branch portions SPE1$b$ may extend from at least one of four edges of the rhombic first plate portion SPE1$a$, for example.

The second sub-pixel electrode SPE2 may include a second plate portion SPE2$a$ and a plurality of second branch portions SPE2$b$. In an exemplary embodiment, the second plate portion SPE2$a$ may have a rhombic plate shape, for example. The second branch portions SPE2$b$ may extend from the second plate portion SPE2$a$. In an exemplary embodiment, the second branch portions SPE2$b$ may extend from at least one of four edges of the rhombic second plate portion SPE2$a$, for example.

The third sub-pixel electrode SPE3 may include a third plate portion SPE3$a$ and a plurality of third branch portions SPE3$b$. In an exemplary embodiment, the third sub-pixel electrode SPE3 may have the same shape as the second sub-pixel electrode SPE2, for example. The fourth sub-pixel electrode SPE4 may include a fourth plate portion SPE4a and a plurality of fourth branch portions SPE4b. In an exemplary embodiment, the fourth sub-pixel electrode SPE4 may have the same shape as the first sub-pixel electrode SPE1, for example.

The first through fourth sub-pixel electrodes SPE1 through SPE4 are separated from each other by a predetermined distance and each of the first through fourth sub-pixel electrodes SPE1 through SPE4 is directly connected to one or two of the other sub-pixel electrodes among the first through fourth sub-pixel electrodes SPE1 through SPE4. In an exemplary embodiment, the first plate portion SPE1a may be connected to the second plate portion SPE2a, and the second plate portion SPE2a may be connected to the first plate portion SPE1a and the third plate portion SPE3a. In addition, the third plate SPE3a may be connected to the second plate portion SPE2a and the fourth plate portion SPE4a, for example. In an alternative embodiment, branch portions included in each sub-pixel electrode, instead of the plate portions, can be connected to branch portions included in an adjacent sub-pixel electrode. A distance t1 between the first sub-pixel electrode SPE1 and the second sub-pixel electrode SPE2 may be about 3 micrometers (μm) in an exemplary embodiment. In addition, a distance between the second sub-pixel electrode SPE2 and the third sub-pixel electrode SPE3 and a distance between the third sub-pixel electrode SPE3 and the fourth sub-pixel electrode SPE4 may be equal to the distance t1 between the first sub-pixel electrode SPE1 and the second sub-pixel electrode SPE2 in an exemplary embodiment.

The area of the first sub-pixel electrode SPE1 may be smaller than that of the second sub-pixel electrode SPE2. The area of the first sub-pixel electrode SPE1 may be substantially equal to the area of the fourth sub-pixel electrode SPE1. In addition, the area of the second sub-pixel electrode SPE2 may be substantially equal to the area of the third sub-pixel electrode SPE3. This will be described in more detail based on the first sub-pixel electrode SPE1 and the second sub-pixel electrode SPE2.

A vertical length h1 of the first sub-pixel electrode SPE1 is smaller than a vertical length h2 of the second sub-pixel electrode SPE2. In contrast, a horizontal length l1 of the first sub-pixel electrode SPE1 may be substantially equal to a horizontal length l2 of the second sub-pixel electrode SPE2.

In an exemplary embodiment, a difference between the vertical length h1 of the first sub-pixel electrode SPE1 and the vertical length h2 of the second sub-pixel electrode SPE2 may be about 7.5 μm for example. In an exemplary embodiment, the horizontal length l1 of the first sub-pixel electrode SPE1 and the horizontal length l2 of the second sub-pixel electrode SPE2 may be about 41.5 μm, for example. However, as long as the vertical length h1 of the first sub-pixel electrode SPE1 is smaller than the vertical length h2 of the second sub-pixel electrode SPE2, the individual values of the vertical length h1 and the horizontal length l1 of the first sub-pixel electrode SPE1 and the vertical length h2 and the horizontal length l2 of the second sub-pixel electrode SPE2 are not particularly limited.

The shielding electrode 180 is disposed on the same layer as the pixel electrode PE. In an exemplary embodiment, the shielding electrode 180 may be made of a transparent conductive material such as ITO or IZO or a reflective metal such as aluminum, silver, chrome or an alloy of these metals. In an exemplary embodiment, the shielding electrode 180 and the pixel electrode PE may be disposed simultaneously by the same mask process, for example.

Hereinafter, the shielding electrode 180 will be described in more detail. The shielding electrode 180 may include first through third sub-shielding electrodes 180a through 180c.

The first sub-shield electrode 180a may at least partially overlap the first scan line SL1. That is, the first sub-shielding electrode 180a is an area of the shielding electrode 180 which extends in the first direction d1 and at least partially overlaps the first scan line SL1. The second sub-shielding electrode 180b may at least partially overlap the second scan line SL2. That is, the second sub-shielding electrode 180b is an area of the shielding electrode 180 which extends in the first direction d1 and at least partially overlaps the second scan line SL2. The third sub-shield electrode 180c may at least partially overlap the first data line DL1. That is, the third sub-shielding electrode 180c is an area of the shielding electrode 180 which extends in the second direction d2 and at least partially overlaps the first data line DL1.

Each of the first through third sub-shield electrodes 180a through 180c is connected to one or two of the other sub-shield electrodes. In an exemplary embodiment, the shielding electrode 180 may be provided with the same voltage as the voltage provided to the common electrode CE, for example.

Hereinafter, the relationship between the shielding electrode 180 and the pixel electrode PE is described using the first sub-shielding electrode 180a, the first sub-pixel electrode SPE1 and the second sub-pixel electrode SPE2 as an example.

The first sub-shielding electrode 180a may include areas having different widths. Hereinafter, an area having a first width w1 and adjacent to the first sub-pixel electrode SPE1 along the second direction d2 will be defined as a first area 180a1. In addition, an area having a second width w2 and adjacent to the second sub-pixel electrode SPE2 along the second direction d2 will be defined as a second area 180a2. In other words, the first area 180a1 is an area of the first sub-shielding electrode 180a, facing the first sub-pixel electrode SPE1. In addition, the second area 180a2 is an area of the first sub-shielding electrode 180a, facing the second sub-pixel electrode SPE2.

More specifically, the first area 180a1 of the first sub-shielding electrode 180a has the first width w1 which is a distance from one side of the first area 180a1 to the other side opposite to the one side in the second direction d2. The second area 180a2 of the first sub-shielding electrode 180a has the second width w2 which is a distance from one side of the second area 180a2 to the other side opposite to the one side in the second direction d2. Here, the first width w1 is greater than the second width w2.

The first width w1 may be about 11.5 μm in an exemplary embodiment, for example. Also, the second width w2 may be about 4 μm in an exemplary embodiment, for example. Accordingly, a difference between the first width w1 and the second width w2 may be about 7.5 μm in an exemplary embodiment, for example. However, as long as the first width w1 is greater than the second width w2, the individual values of the first width w1 and the second width w2 are not particularly limited.

The first sub-shielding electrode 180a is separated from each of the first sub-pixel electrode SPE1 and the second sub-pixel electrode SPE2 by predetermined distances. Here, a space between the first area 180a1 of the first sub-shielding electrode 180a and the first sub-pixel electrode SPE1 is defined as a first spacing area G1. In addition, a space between the second area 180a2 of the first sub-shielding electrode 180a and the second sub-pixel electrode SPE2 is defined as a second spacing area G2. The first sub-pixel electrode SPE1 and the second sub-pixel electrode SPE2 are not disposed in the first spacing area G1 and the second spacing area G2, respectively. The first spacing area G1 and the second spacing area G2 will be described later with reference to FIG. 5.

The pixel electrode PE may be disposed on the same layer as the shielding electrode 180. Furthermore, the shielding electrode 180 and the pixel electrode PE are insulated from each other. The vertical length h2 of the second sub-pixel electrode SPE2 is greater than the vertical length h1 of the first sub-pixel electrode SPE1. Thus, the second area 180a2 of the first sub-shielding electrode 180a may be recessed in a third direction d3 by an amount of a difference between the vertical length h2 of the second sub-pixel electrode SPE2 and the vertical length h1 of the first sub-pixel electrode SPE1. This can be reflected as the second width w2 of the second area 180a2 is smaller than the first width w1 of the first area 180a1.

In contrast, the second sub-shielding electrode 180b may be provided to have a uniform width. In an exemplary embodiment, the width of the second sub-shielding electrode 180b may be equal to the first width w1, for example.

Although not illustrated in the drawings, a first alignment layer may be disposed on the pixel electrode PE and the shielding electrode 180. In an exemplary embodiment, the first alignment layer may be made of, e.g., polyimide.

Hereinafter, the upper display panel 20 will be described.

An upper substrate 210 may be placed to face the lower substrate 110. In an exemplary embodiment, the upper substrate 210 may be made of transparent glass or plastic, for example. In an exemplary embodiment, the upper substrate 210 may be made of the same material as the lower substrate 110, for example.

The black matrix BM may be disposed on the upper substrate 210. The black matrix BM disposed on the upper substrate 210 may block light from transmitting through areas other than a pixel area. In an exemplary embodiment, the black matrix BM may be made of a metal material including organic matter or chrome, for example.

In a pixel electrode including at least two sub-pixel electrodes, the black matrix BM at least partially overlaps one of the sub-pixel electrodes but does not overlap the other sub-pixel electrode.

Referring to FIGS. 1 and 5, the black matrix BM may not overlap the first sub-pixel electrode SPE1 and the fourth sub-pixel electrode SPE4 in the direction perpendicular to the major surface plane defining the lower substrate 110. In contrast, the black matrix BM may overlap at least part of each of the second sub-pixel electrode SPE2 and the third sub-pixel electrode SPE3 in the direction perpendicular to the major surface plane defining the lower substrate 110. Hereinafter, this will be described based on the first sub-pixel electrode SPE1 and the second sub-pixel electrode SPE2.

The black matrix BM may not overlap the first sub-pixel electrode SPE1 in the direction perpendicular to the major surface plane defining the lower substrate 110. In contrast, the black matrix BM may completely overlap the first area 180a1 of the first sub-shielding electrode 180a in the direction perpendicular to the major surface plane defining the lower substrate 110. In addition, the black matrix BM may overlap at least part of the first spacing area G1 or may not overlap the first spacing area G1. The black matrix BM may overlap at least part of the second sub-pixel electrode SPE2 in the direction perpendicular to the major surface plane defining the lower substrate 110. The first scan line SL1 may also overlap at least part of the second sub-pixel electrode SPE2 in the direction perpendicular to the major surface plane defining the lower substrate 110.

The black matrix BM may completely overlap the second area 180a2 of the first sub-shielding electrode 180a in the direction perpendicular to the major surface plane defining the lower substrate 110. In addition, the black matrix BM may completely overlap the second spacing area G2.

Accordingly, the black matrix BM may completely cover liquid crystal molecules located in the second spacing area G2 among the liquid crystal molecules 31. This will be described later with reference to FIG. 9A through 9E.

The color filter CF may be disposed on the black matrix BM and the upper substrate 210. In an exemplary embodiment, the color filter CF may represent, but not limited to, one of three primary colors such as red, green, and blue. The color filter CF may be made of a material that displays different colors in adjacent pixels.

A planarization layer 220 may be disposed on the color filter CF and the black matrix BM. In an exemplary embodiment, the planarization layer 220 may be made of an insulating material and may be omitted in some cases.

The common electrode CE may be disposed on the planarization layer 220. The common electrode CE may overlap the pixel electrode PE in the direction perpendicular to the major surface plane defining the lower substrate 110. In an exemplary embodiment, the common electrode CE may be made of a transparent conductive material such as ITO or IZO or a reflective metal such as aluminum, silver, chromium or an alloy of these metals.

Referring to FIG. 6, the common electrode CE may defined the first through fourth slit portions SLT1 through SLT4. If the common electrode CE is made of a transparent conductive material, the first through fourth slit portions SLT1 through SLT4 may be defined as areas in which no transparent conductive material is disposed.

The first through fourth slit portions SLT1 through SLT4 may respectively overlap the first through fourth sub-pixel electrodes SPE1 through SPE4 in the direction perpendicular to the major surface plane defining the lower substrate 110. In an exemplary embodiment, each of the first through fourth slit portions SLT1 through SLT4 may be cross-shaped, for example. The first slit portion SLT1 may have the same shape and size as the fourth slit portion SLT4 in an exemplary embodiment. The second slit portion SLT2 may have the same shape and size as the third slit portion SLT3 in an exemplary embodiment.

Hereinafter, the relationship between the pixel electrode PE and the common electrode CE will be described with reference to FIGS. 1, 4 and 6 based on the first sub-pixel electrode SPE1, the second sub-pixel electrode SPE2, the first slit portion SLT1 and the second slit portion SLT2.

In an exemplary embodiment, a vertical length hs1 of the first slit portion SLT1 is smaller than a vertical length hs2 of the second slit portion SLT2. In contrast, a horizontal length ls1 of the first slit portion SLT1 may be equal to a horizontal length ls2 of the second slit portion SLT2. In an exemplary embodiment, the vertical length hs1 and the horizontal length ls1 of the first slit portion SLT1 may correspond to the vertical length h1 and the horizontal length l1 of the first sub-pixel electrode SPE1, respectively. In an exemplary embodiment, the vertical length hs2 and the horizontal length ls2 of the second slit portion SLT2 may correspond to the vertical length h2 and the horizontal length l2 of the second sub pixel electrode SPE2, respectively.

Although not illustrated in the drawings, a second alignment layer may be disposed on the common electrode CE.

In an exemplary embodiment, the second alignment layer may be made of, e.g., polyimide.

Hereinafter, the liquid crystal layer 30 will be described.

The liquid crystal layer 30 includes the liquid crystal molecules 31 having negative dielectric anisotropy. In an exemplary embodiment, the liquid crystal molecules 31 may change the polarization of light by rotating or tilting in a specific direction when an electric field is provided between the lower substrate 110 and the upper substrate 210.

Figure 9A:
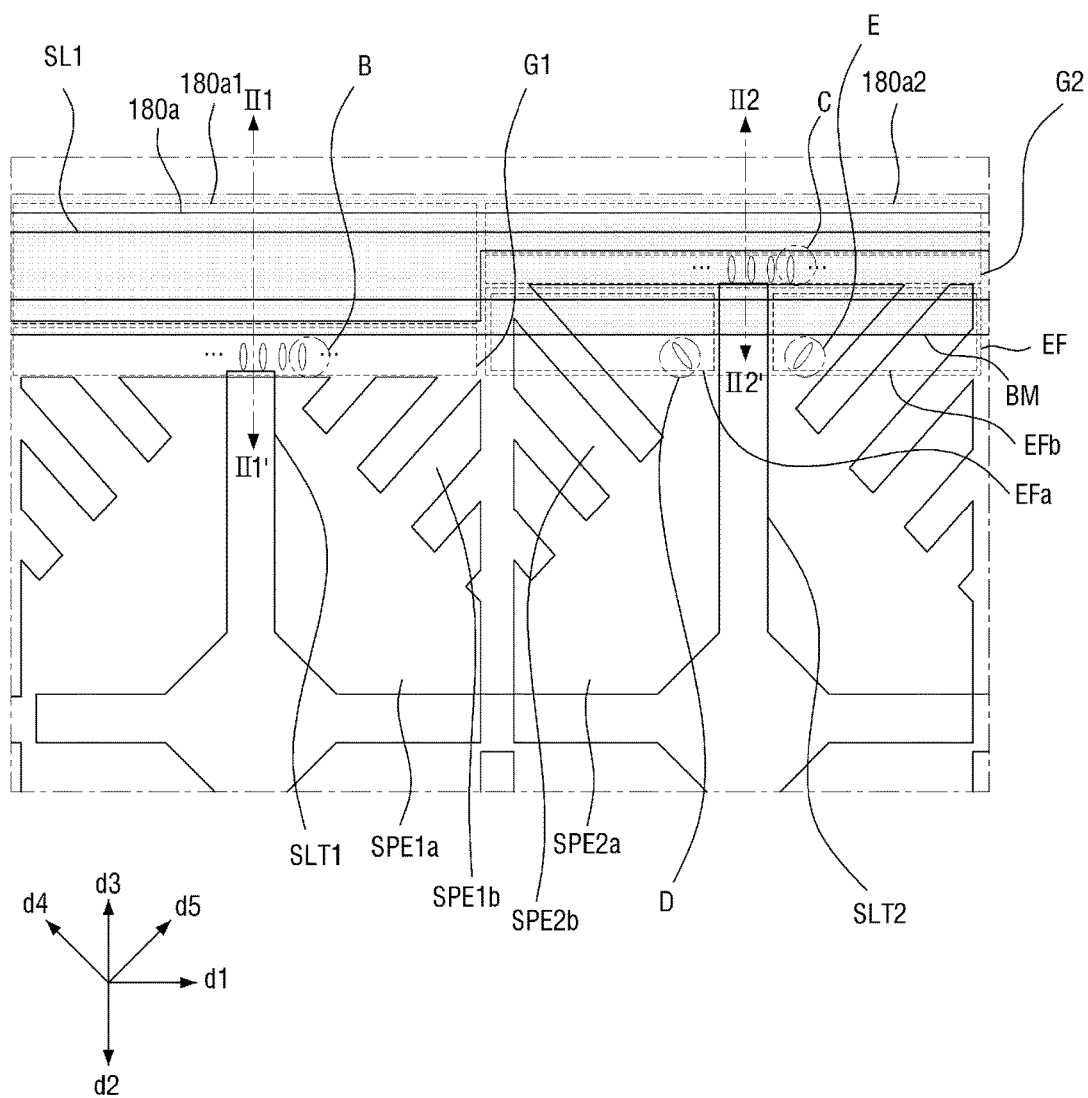
FIG. 9A is an enlarged view of an exemplary embodiment of an area A illustrated in FIG. 1.
Figure 9B:
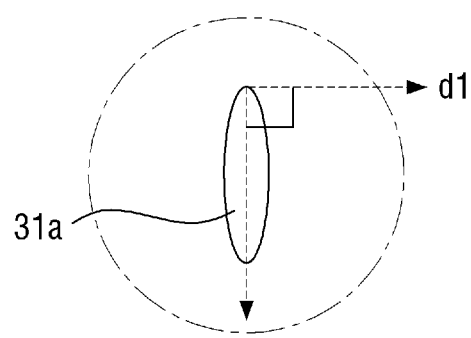
FIG. 9B is an enlarged view of an exemplary embodiment of an area B illustrated in FIG. 9A.
Figure 9C:
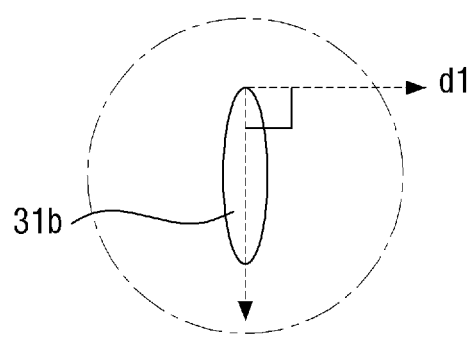
FIG. 9C is an enlarged view of an exemplary embodiment of an area C illustrated in FIG. 9A.
Figure 9D:
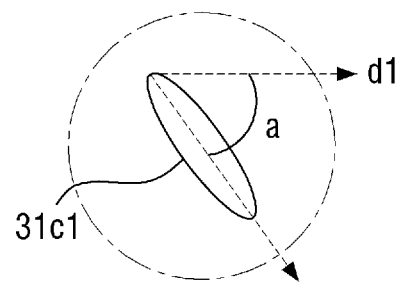
FIG. 9D is an enlarged view of an exemplary embodiment of an area D illustrated in FIG. 9A.
Figure 9E:
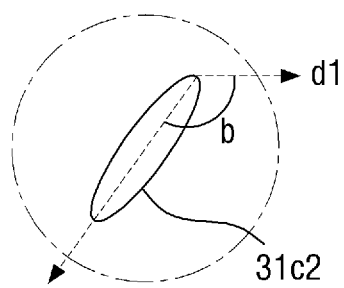
FIG. 9E is an enlarged view of an exemplary embodiment of an area E illustrated in FIG. 9A.
Figure 10:
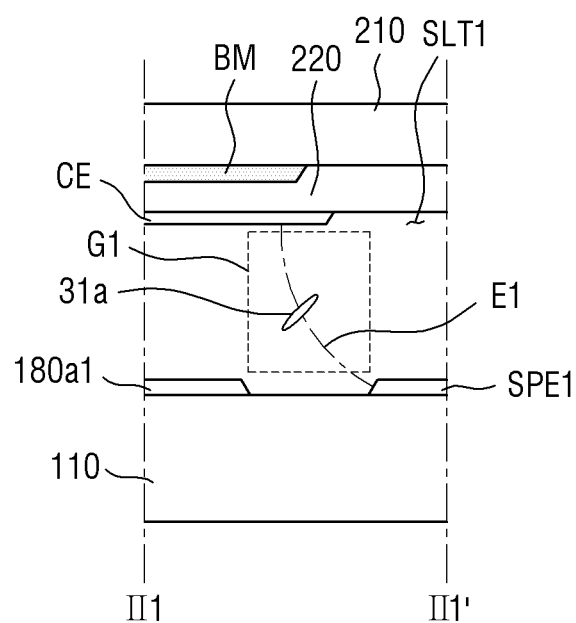
FIG. 10 is a cross-sectional view taken along line II1-II1' of FIG. 9A.
Figure 11:
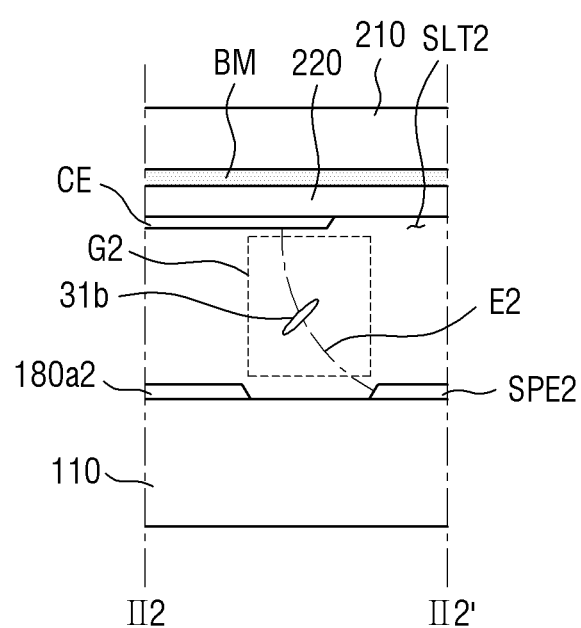
FIG. 11 is a cross-sectional view taken along line II2-II2' of FIG. 9A.

FIG. 9A is an enlarged view of an exemplary embodiment of an area A illustrated in FIG. 1. FIG. 9B is an enlarged view of an exemplary embodiment of an area B illustrated in FIG. 9A. FIG. 9C is an enlarged view of an exemplary embodiment of an area C illustrated in FIG. 9A. FIG. 9D is an enlarged view of an exemplary embodiment of an area D illustrated in FIG. 9A. FIG. 9E is an enlarged view of an exemplary embodiment of an area E illustrated in FIG. 9A. FIG. 10 is a cross-sectional view taken along line II1-II1' of FIG. 9A. FIG. 11 is a cross-sectional view taken along line II2-II2' of FIG. 9A. For ease of description, FIGS. 10 and 11 illustrate mainly the pixel electrode PE, the common electrode CE, the black matrix BM, and the shielding electrode 180.

Referring to FIGS. 1 and 9 through 11, the LCD device may further include an electric field area EF. The electric field area EF may be adjacent to the first spacing area G1 in the first direction d1 and to the second spacing area G2 in the second direction d2. As described above, the pixel electrode PE is not disposed in the first spacing area G1 and the second spacing area G2. In contrast, at least part of the second sub-pixel electrode SPE2 is disposed in the electric field area EF.

Hereinafter, one of liquid crystal molecules located in the first spacing area G1 will be referred to as a first liquid crystal molecule 31a, one of liquid crystal molecules located in the second spacing area G2 will be referred to as a second liquid crystal molecule 31b, and one of liquid crystal molecules located in the electric field area EF will be referred to as a third liquid crystal molecule 31c.

When an electric field is provided between the pixel electrode PE and the common electrode CE, the first through third liquid crystal molecules 31a through 31c are tilted at predetermined angles according to the electric field.

The first sub-pixel electrode SPE1 is not disposed in the first spacing area G1. Accordingly, the first liquid crystal molecule 31a disposed in the first spacing area G1 is tilted at an azimuth of about 90 degrees to the first direction d1 in a plain view of the LCD device when an electric field E1 is provided between an end of the first sub-pixel electrode SPE1 and the common electrode CE.

The second sub-pixel electrode SPE2 is not disposed in the second spacing area G2. Accordingly, the second liquid crystal molecule 31b is fitted at an azimuth of about 90 degrees to the first direction d1 in a plain view of the LCD device when an electric field E2 is provided between an end of the second sub-pixel electrode SPE2 and the common electrode CE.

In contrast, at least part of the second sub-pixel electrode SPE2 is disposed in the electric field area EF. Accordingly, the third liquid crystal molecule 31c is tilted at an azimuth of about 45 degrees or about 135 degrees in a plain view of the LCD device when an electric field is provided between the at least part of the second sub-pixel electrode SPE2 and the common electrode CE.

More specifically, the second branch portions SPE2b may include branch portions extending from the second plate portion SPE2a in a fourth direction d4 and branch portions extending from the second plate portion SPE2a in a fifth direction d5. In addition, the electric field area EF may include a first sub-electric field area EFa which corresponds to the branch portions extending from the second plate portion SPE2a in the fourth direction d4 and a second sub-electric field area EFb which corresponds to the branch portions extending from the second plate portion SPE2a in the fifth direction d5.

Among the third liquid crystal molecules 31c, a liquid crystal molecule 31c1 disposed in the first sub-field area EFa may be tilted at a predetermined azimuth when an electric field is provided by the branch portions extending from the second branch portions SPE2b in the fourth direction d4, the second plate portion SPE2a, the second slit portion SLT2 and the common electrode CE. More specifically, the liquid crystal molecule 31c1 may be tilted at an azimuth a of about 45 degrees to the first direction d1.

In addition, among the third liquid crystal molecules 31c, a liquid crystal molecule 31c2 disposed in the second sub-field area EFb may be tilted at a predetermined azimuth when an electric field is provided by the branch portions extending from the second branch portions SPE2b in the fifth direction d5, the second plate portion SPE2a, the second slit portion SLT2 and the common electrode CE. More specifically, the liquid crystal molecule 31c2 may be tilted at an azimuth b of about 135 degrees to the first direction d1.

Referring to FIG. 10, only at least part of the first spacing area G1 may be overlapped by the black matrix BM. In contrast, referring to FIG. 11, the second spacing area G2 may be entirely overlapped by the black matrix BM. Accordingly, the second liquid crystal molecule 31b disposed in the second spacing area G2 may be overlapped by the black matrix BM.

Generally, if a liquid crystal molecule tilted at an azimuth of about 90 degrees to the first direction d1 is viewed from a side of the LCD device, which corresponds to the first direction d1, when the LCD device displays an image of a low gray level, a side surface of the liquid crystal molecule is observed. Since light can be leaked through the observed side surface of the liquid crystal molecule, it may reduce visibility of the image from the side view. In contrast, if a liquid crystal molecule tilted at an azimuth of about 0 degrees to the first direction d1 is viewed from the side of the LCD device, which corresponds to the first direction d1, when the LCD device displays an image of a low gray level, an end of the liquid crystal molecule may be observed. Therefore, it may improve visibility of the image from the side view.

Generally, in an image of a high gray level, transmittance may increase as the azimuth of a liquid crystal molecule is closer to about 90 degrees with respect to the first direction d1. In contrast, transmittance may decrease as the azimuth of the liquid crystal molecule is closer to about 0 degrees with respect to the first direction d1.

Referring back to FIG. 9A, as described above, the second liquid crystal molecule 31b disposed in the second spacing area G2 is tilted at an azimuth of about 90 degrees to the first direction d1 at a low gray level. However, the second spacing area G2 is overlapped by the black matrix BM. Accordingly, the light leaked by the second liquid crystal molecule 31b located in the second spacing area G2 is prevented from going outside the LCD device by the black matrix BM. Therefore, the visibility of an image at a low gray level from the side view can be improved.

In addition, the liquid crystal molecule 31c1 disposed in the first sub-field area EFa is tilted at an azimuth of about 45 degrees to the first direction d1, and the liquid crystal molecule 31c2 disposed in the second sub-field area EFb is tilted at an azimuth of about 135 degrees to the first direction d1 (that is, an included angle between the liquid crystal molecule 31c2 and a virtual line extending in the first direction d1 is about 45 degrees). This can improve visibility of an image at a low gray level and effectively minimize a reduction in transmittance at a high gray level.

Figure 12:
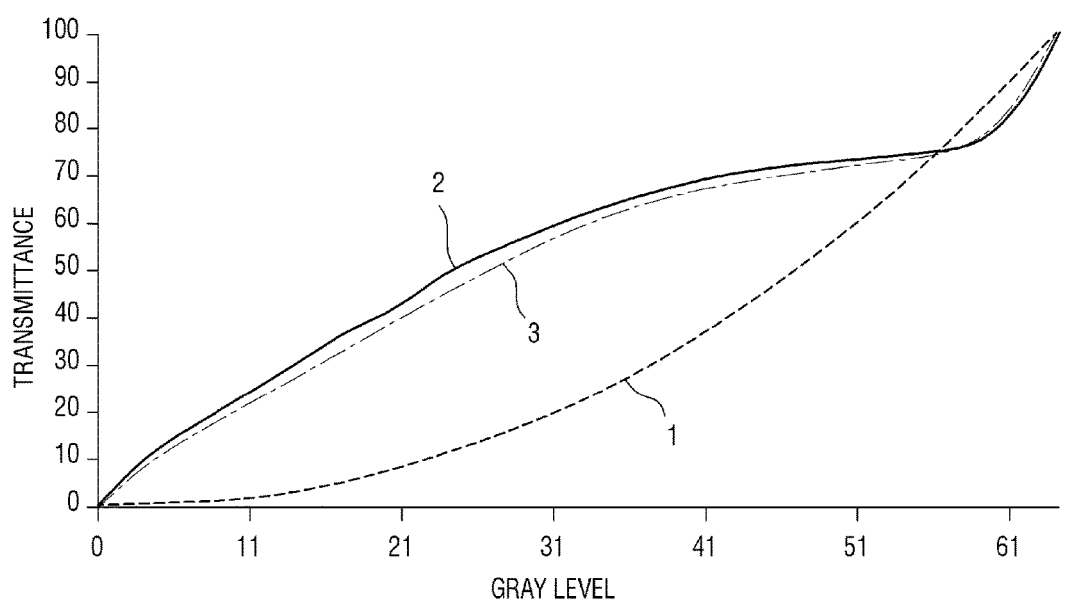
FIG. 12 is a graph illustrating transmittance versus gray level of an exemplary embodiment of an LCD device.

FIG. 12 is a graph illustrating transmittance versus gray level of an exemplary embodiment of an LCD device. The horizontal axis of the graph represents gray level, and the vertical axis represents transmittance T. Reference numeral 1 indicates transmittance with respect to gay level at a front view of the LCD device, and reference numerals 2 and 3 indicate transmittances with respect to gray level at a side view of the LCD device. Here, reference numeral 2 indicates an LCD device according to a comparative example, and reference numeral 3 indicates an LCD device according to an exemplary embodiment.

Referring to FIG. 12, at low gray levels of an image, the LCD device 3 according to the exemplary embodiment has improved visibility at the side view because the transmittance of the LCD device 3 according to the exemplary embodiment is relatively close to the transmittance 1 with respect to gray level at the front view. In addition, at high gray levels of an image, the LCD device 3 according to the exemplary embodiment has even higher transmittance than the LCD device 2 according to the comparative example.

Table 1 below shows the transmittance and visibility index ("GDI") of each of the LCD device 3 according to the exemplary embodiment and the LCD device 2 according to the comparative example.

TABLE 1

|  | Exemplary Embodiment | Comparative example |
| --- | --- | --- |
| Transmittance (%) | 104 | 100 |
| Visibility index (GDI) | 0.425 | 0.444 |

Referring to Table 1 and FIG. 12, the LCD device 3 according to the exemplary embodiment has higher transmittance and lower visibility index than the LCD device 2 according to the comparative example. Therefore, the LCD device 3 according to the exemplary embodiment has improved lateral visibility.

FIGS. 13 through 16 are schematic plan views of other exemplary embodiments of pixels included in LCD devices. A description of elements and features identical to those described above with reference to FIGS. 1 through 12 will be omitted. In addition, elements identical to those described above will be indicated by the same reference characters. For ease of description, FIGS. 13 through 16 illustrates mainly a pixel electrode PE and a shielding electrode 180.

Figure 13:
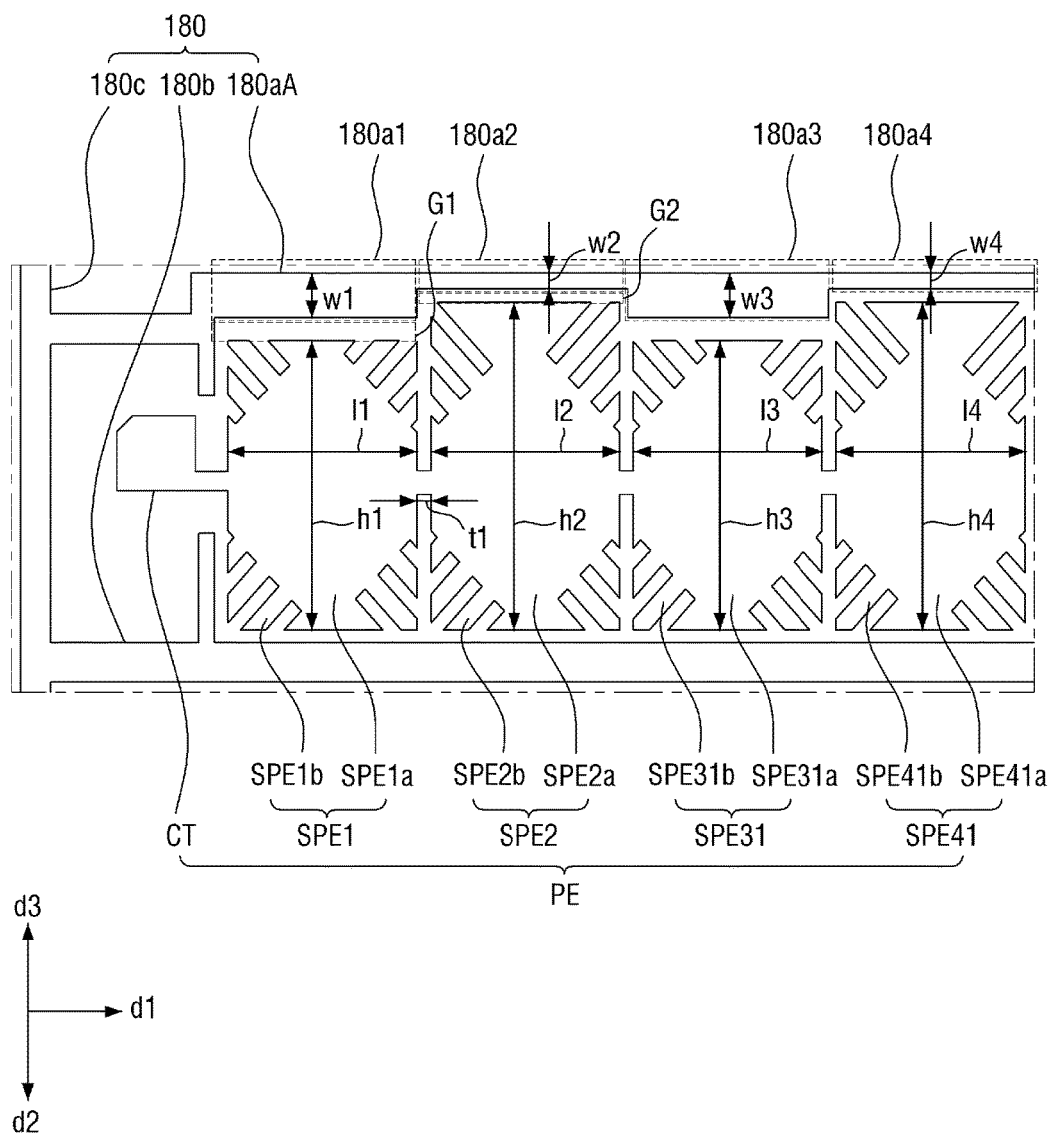
FIGS. 13 through 16 are schematic plan views of other exemplary embodiments of pixels included in LCD devices.

Referring to FIG. 13, a first sub-pixel electrode SPE1 may have the same shape as a third sub-pixel electrode SPE31. The third sub-pixel electrode SPE31 may include a third plate portion SPE31a and a plurality of third branch portions SPE31b. A second sub-pixel electrode SPE2 may have the same shape as a fourth sub-pixel electrode SPE41. The fourth sub-pixel electrode SPE41 may include a fourth plate portion SPE4a and a plurality of fourth branch portions SPE4b. A vertical length h1 of the first sub-pixel electrode SPE1 is smaller than a vertical length h2 of the second sub-pixel electrode SPE2. A vertical length h3 of the third sub-pixel electrode SPE31 is smaller than a vertical length h4 of the fourth sub-pixel electrode SPE41. In an exemplary embodiment, horizontal lengths l1 through l4 of the first through fourth sub-pixel electrodes SPE1 through SPE41 may be substantially equal to each other, for example.

A first sub-shielding electrode 180aA, which corresponds to the first sub-shielding electrode 180a in FIG. 4, may include a first area 180a1, a second area 180a2, a third area 180a3, and a fourth area 180a4. The first through fourth areas 180a1 through 180a4 may be arranged along the first direction d1 with an order of the first through fourth areas 180a1 through 180a4. A first width w1 of the first area 180a1 may be substantially equal to a third width w3 of the third area 180a3 along the second direction d2. A second width w2 of the second area 180a2 may be substantially equal to a fourth width w4 of the fourth area 180a4 along the second direction d2. That is, the second area 180a2 and the fourth area 180a4 of the first sub-shielding electrode 180a may be recessed in the third direction d3.

The first through fourth sub-pixel electrodes SPE1 through SPE41 may face the first through fourth areas 180a1 through 180a4 of the first sub-shield electrode 180aA, respectively.

The first sub-pixel electrode SPE1 and the third sub-pixel electrode SPE31 may not overlap a black matrix BM. In addition, at least part of each of the second sub-pixel electrode SPE2 and the fourth sub-pixel electrode SPE41 may overlap the black matrix BM.

That is, while the space between the first sub-shielding electrode 180aA and each of the second sub-pixel electrode SPE2 and the third sub-pixel electrode SPE31 is overlapped by the black matrix BM in FIGS. 1 through 12, a space between the first sub-shielding electrode 180aA and each of the second sub-pixel electrode SPE2 and the fourth sub-pixel electrode SPE41 is overlapped by the black matrix BM.

However, as long as one of at least two sub-pixel electrodes included in a pixel electrode overlaps the black matrix BM and the other sub-pixel electrode does not overlap the black matrix BM, the arrangement of the sub-pixel electrodes and the shape of the first sub-shielding electrode 180aA are not limited to those illustrated in the drawing.

Figure 14:
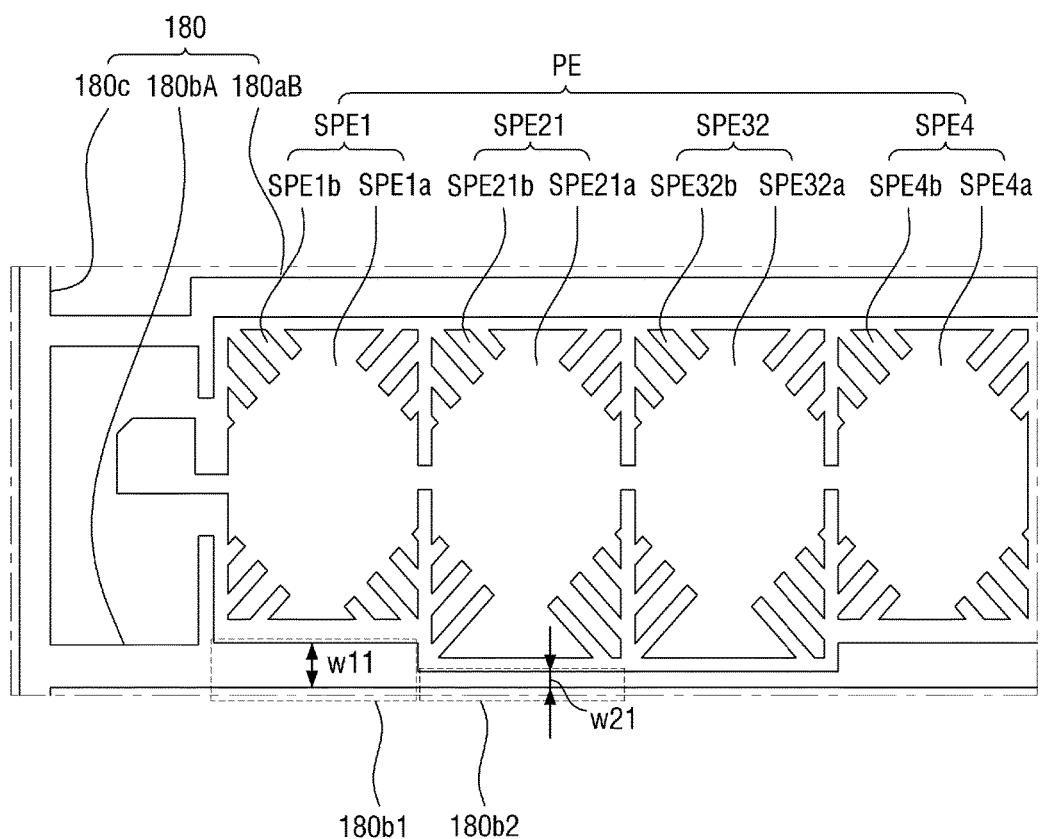

Referring to FIG. 14, a second sub-pixel electrode SPE21 and a third sub-pixel electrode SPE32 may extend further in the second direction d2 than the first sub-pixel electrode SPE1 and the fourth sub-pixel electrode SPE4. The second sub-pixel electrode SPE21 may include a second plate portion SPE21a and a plurality of second branch portions SPE21b. The third sub-pixel electrode SPE32 may include a third plate portion SPE32a and a plurality of third branch portions SPE32b. A first sub-shielding electrode 180aB and a second sub-shielding electrode 180bA correspond to the first sub-shielding electrode 180a and the second sub-shielding electrode 180b in FIG. 4 respectively. Accordingly, the second sub-shielding electrode 180bA may include areas having different widths which correspond to the second sub-pixel electrode SPE21 and the third sub-pixel electrode SPE32. The second sub-shielding electrode 180bA overlaps the second scan line SL2 which is electrically connected to the gate electrode GE in the direction perpendicular to the major surface plane defining the lower substrate 110. That is, a first area 180b1 having a first width w11 and a second area 180b2 having a second width w21 may be located in the second sub-shielding electrode 180bA. The first width w11 may be greater than the second width w21 in the second direction d2.

Although not illustrated in the drawing, the second sub-pixel electrode SPE21 and the third sub-pixel electrode SPE32 may extend further along each of the second direction d2 and the third direction d3. In this case, each of a first sub-shielding electrode 180aB and the second sub-shielding electrode 180bA may include areas having different widths corresponding to the sizes of the sub-pixel electrodes.

Figure 15:
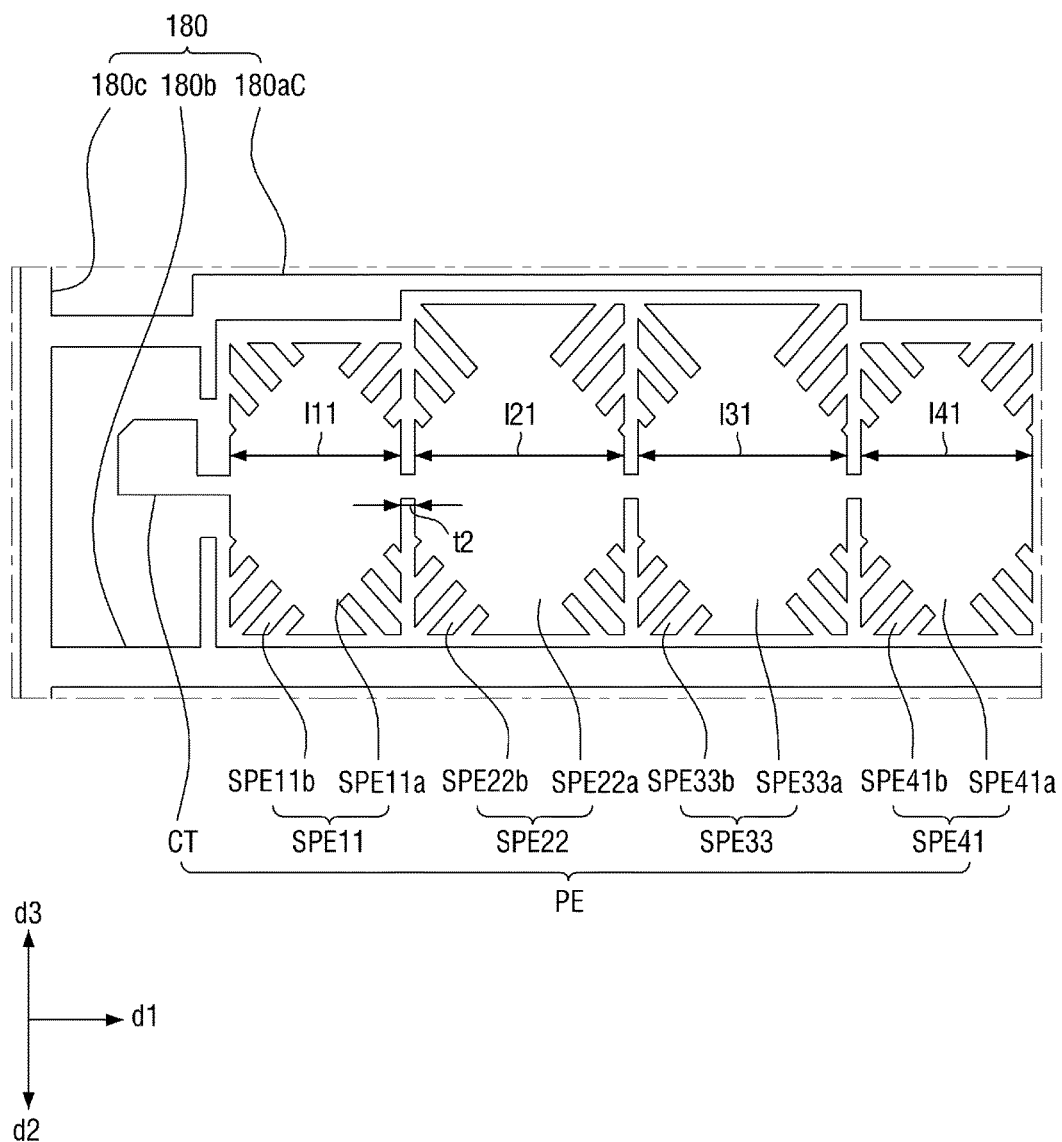

Referring to FIG. 15, a horizontal length l11 of a first sub-pixel electrode SPE11 may be different from a horizontal length l21 of a second sub-pixel electrode SPE22 in the first direction d1. More specifically, in an exemplary embodiment, the horizontal length l11 of the first sub-pixel electrode SPE11 may be about 38.5 μm, for example. In an exemplary embodiment, the horizontal length l21 of the second sub-pixel electrode SPE22 may be about 41.5 μm, for example. A horizontal length l31 of a third sub-pixel electrode SPE33 may be equal to the horizontal length l21 of the second sub-pixel electrode SPE22, and a horizontal length l41 of a fourth sub-pixel electrode SPE41 may be equal to the horizontal length l11 of the first sub-pixel electrode SPE11. The first through fourth sub-pixel electrodes SPE11 through SPE41 may include first through fourth plate portions SPE11a through SPE41a and a plurality of first through fourth branch portions SPE11b through SPE41b respectively. The first sub-shielding electrode 180aC corresponds to the first sub-shielding electrode 180a in FIG. 4.

A distance t2 between the first sub-pixel electrode SPE11 and the second sub-pixel electrode SPE22 may be about 5 μm in an exemplary embodiment, for example. In an exemplary embodiment, a distance between the second sub-pixel electrode SPE22 and the third sub-pixel electrode SPE33 and a distance between the third sub-pixel electrode SPE33 and the fourth sub-pixel electrode SPE41 may be equal to the distance t2 between the first sub-pixel electrode SPE11 and the second sub-pixel electrode SPE22.

That is, an electric field at a low gray level can be reinforced by forming the horizontal length l11 of the first sub-pixel electrode SPE11 smaller than the horizontal length l22 of the second sub-pixel electrode SPE22 and increasing the distance t2 between the first sub-pixel electrode SPE11 and the second sub-pixel electrode SPE22. As a result, lateral visibility can be improved.

Figure 16:
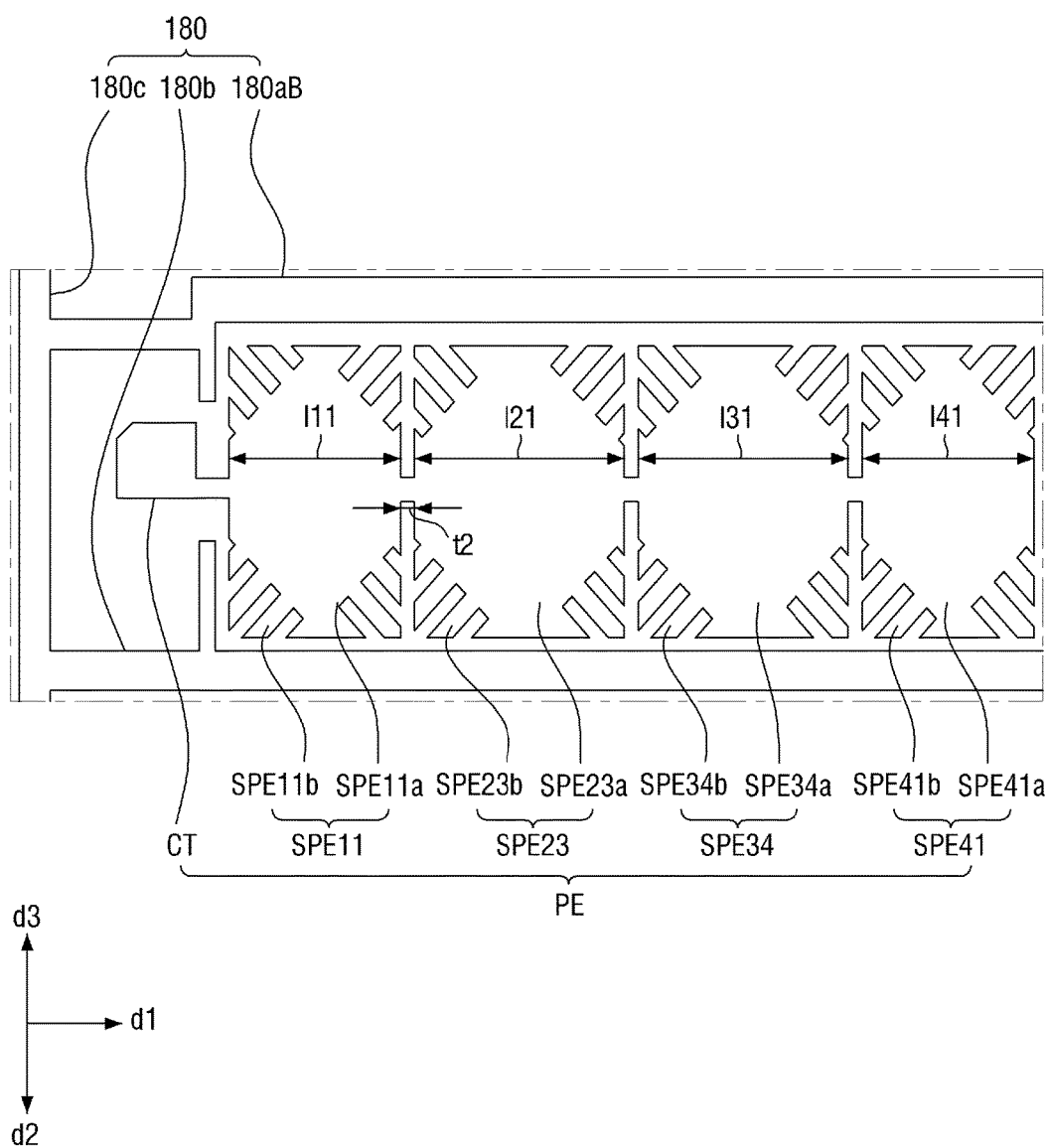

Referring to FIG. 16, first through fourth sub-pixel electrodes SPE11 through SPE41 may have the same vertical length in the second direction d2. In contrast, the horizontal length l11 of the first sub-pixel electrode SPE11 may be different from the horizontal length l21 of the second sub-pixel electrode SPE23 in the first direction d1. In an exemplary embodiment, the horizontal length l11 of the first sub-pixel electrode SPE11 may be about 38.5 μm, and the horizontal length l21 of the second sub-pixel electrode SPE23 may be about 41.5 μm, for example. The horizontal length l31 of the third sub-pixel electrode SPE34 may be equal to the horizontal length l21 of the second sub-pixel electrode SPE23, and the horizontal length l41 of the fourth sub-pixel electrode SPE41 may be equal to the horizontal length l11 of the first sub-pixel electrode SPE11. The second and third sub-pixel electrodes SPE23 and SPE34 may include second and third plate portions SPE23a and SPE34a and a plurality of second and third branch portions SPE23b through SPE34b respectively.

The distance t2 between the first sub-pixel electrode SPE11 and the second sub-pixel electrode SPE23 may be about 5 μm in an exemplary embodiment, for example. A distance between the second sub-pixel electrode SPE23 and the third sub-pixel electrode SPE34 and a distance between the third sub-pixel electrode SPE34 and the fourth sub-pixel electrode SPE41 may be equal to the distance t2 between the first sub-pixel electrode SPE11 and the second sub-pixel electrode SPE23 in an exemplary embodiment, for example.

The first sub-shielding electrode 180aB may be provided to have substantially a uniform width in the second direction d2. The second sub-shielding electrode 180b may be provided to have substantially a uniform width in the second direction d2.

Figure 17:
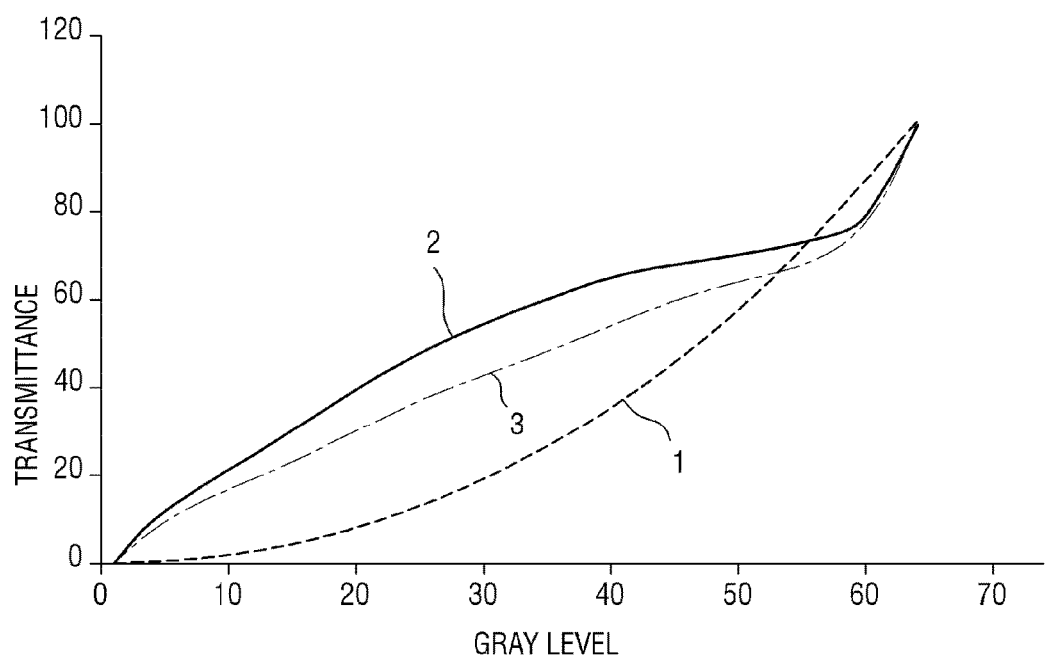
FIG. 17 is a graph illustrating transmittance versus gray level of an exemplary embodiment of the LCD device of FIG. 16.

FIG. 17 is a graph illustrating transmittance versus gray level of an exemplary embodiment of the LCD device of FIG. 16. The horizontal axis of the graph represents gray level, and the vertical axis represents transmittance T. Reference numeral 1 indicates transmittance with respect to gray level at the front view of the LCD device, and reference numerals 2 and 3 indicate transmittances with respect to gray level at the side view of the LCD device. Here, reference numeral 2 indicates an LCD device according to a comparative example, and reference numeral 3 indicates an LCD device according to an exemplary embodiment.

Table 2 below shows the transmittance and GDI of each of the LCD device 3 according to the exemplary embodiment and the LCD device 2 according to the comparative example.

TABLE 2

|  | Embodiment (FIG. 16) | Comparative example |
| --- | --- | --- |
| Transmittance (%) | 102 | 100 |
| Visibility index (GDI) | 0.404 | 0.444 |

Referring to Table 2 and FIG. 17, the LCD device 3 according to the exemplary embodiment of FIG. 16 has higher transmittance and lower visibility index than the LCD device 2 according to the comparative example. Therefore, the LCD device 3 according to the exemplary embodiment has improved lateral visibility.

More specifically, since the area of the first sub-pixel electrode SPE11 and the area of the second sub-pixel electrode SPE23 (or the area of the third sub-pixel electrode SPE34 and the area of the fourth sub-pixel electrode SPE4) are different, there is a difference in voltage-transmittance ratio between the first sub-pixel electrode SPE11 and the second sub-pixel electrode SPE23. The difference in voltage-transmittance ratio improves lateral visibility of the LCD device 3 according to the exemplary embodiment.

Figure 18:
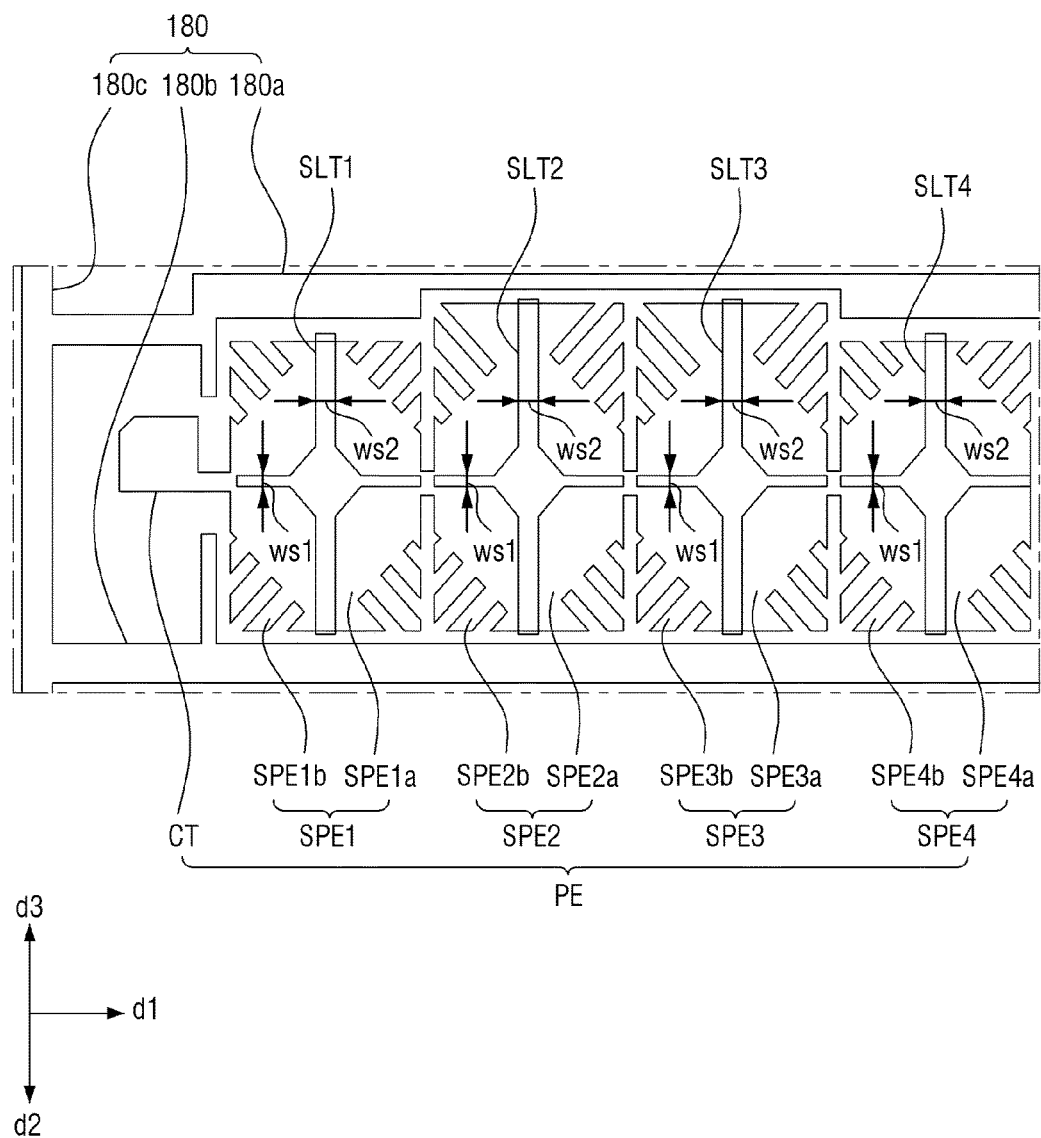
FIG. 18 is a schematic plan view of an exemplary embodiment of a pixel included in an LCD device of FIG. 1.

FIG. 18 is a schematic plan view of an exemplary embodiment of a pixel included in an LCD device of FIG. 1. For ease of description, FIG. 18 illustrates mainly the pixel electrode PE, the shielding electrode 180 and the first through fourth slit portions SLT1 through SLT4.

Referring to FIG. 18, the first slit portion SLT1 may be the same shape and size as the fourth slit portion SLT4 in an exemplary embodiment. The second slit portion SLT2 may be the same shape and size as the third slit portion SLT3 in an exemplary embodiment. Horizontal lengths of the first slit SLT1 through the fourth slit SLT4 may all be the same in the first direction d1.

In contrast, horizontal widths ws1 of the first through fourth slit portions SLT1 through SLT4 in the second direction d2 may be different from vertical widths ws2 of the first through fourth slit portions SLT1 through SLT4 in the first direction d1. In an exemplary embodiment, the horizontal widths ws1 of the first through fourth slit portions SLT1 through SLT4 may be smaller than the vertical widths ws2 of the first through fourth slit portions SLT1 through SLT4. The vertical widths ws1 of the first through fourth slit portions SLT1 through SLT4 may be about 3 µm in an exemplary embodiment, for example. The vertical widths ws2 of the first through fourth slit portions SLT1 through SLT4 may be about 5 µm in an exemplary embodiment, for example.

Since the horizontal widths ws1 of the first through fourth slit portions SLT1 through SLT4 are smaller than the vertical widths ws2 of the first through fourth slit portions SLT1 through SLT4, a strong electric field can be provided in the first direction d1 and in a direction opposite to the first direction d1. As a result, lateral visibility at a low gray level can be improved.

Figure 19:
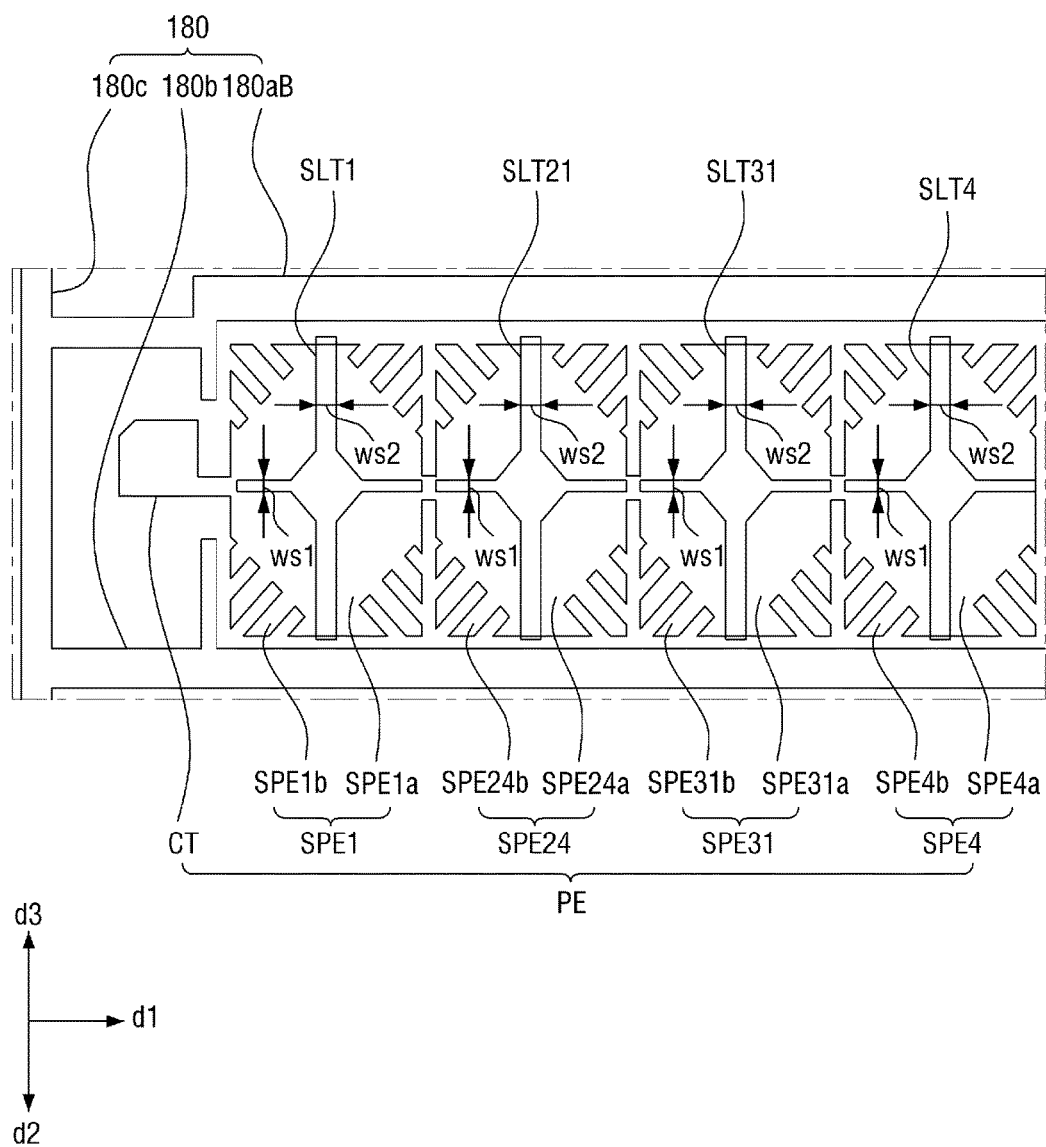
FIG. 19 is a schematic plan view of another exemplary embodiment of a pixel included in an LCD.

FIG. 19 is a schematic plan view of another exemplary embodiment of a pixel included in an LCD device.

Referring to FIG. 19, first through fourth slit portions SLT1 through SLT4 may all have the same shape.

That is, horizontal widths ws1 of the first through fourth slit portions SLT1 through SLT4 in the second direction d2 may be different from vertical widths ws2 of the first through fourth slit portions SLT1 through SLT4 in the first direction d1. More specifically, the horizontal widths ws1 of the first through fourth slit portions SLT1 through SLT4 may be smaller than the vertical widths ws2 of the first through fourth slit portions SLT1 through SLT4. The horizontal widths ws1 of the first through fourth slit portions SLT1 through SLT4 may be about 3 µm in an exemplary embodiment, for example. The vertical widths ws2 of the first through fourth slit portions SLT1 through SLT4 may be about 5 µm in an exemplary embodiment, for example. The second sub-pixel electrode SPE24 may include second plate portions SPE24a and a plurality of second branch portions SPE24b respectively. The second and third slit portions SLT21 and SLT31 correspond to the second and third slit portions SLT2 and SLT3 in FIG. 1 respectively.

Figure 20:
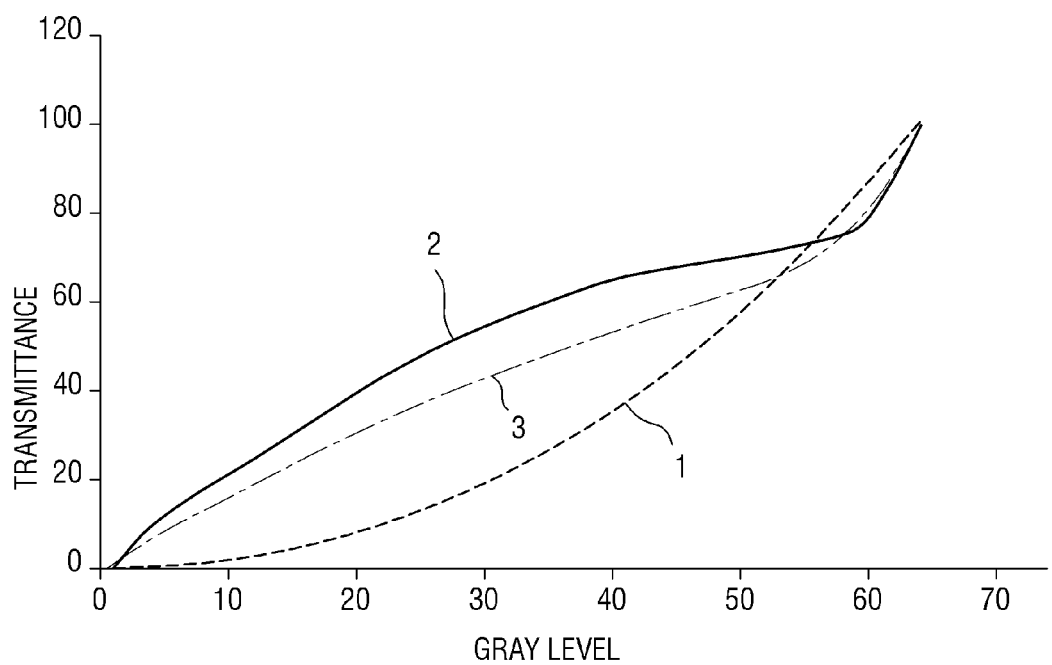
FIG. 20 is a graph illustrating transmittance versus gray level of an exemplary embodiment of the LCD device of FIG. 19.

FIG. 20 is a graph illustrating transmittance versus gray level of an exemplary embodiment of the LCD device of FIG. 19. The horizontal axis of the graph represents gray level, and the vertical axis represents transmittance T. Reference numeral 1 indicates transmittance with respect to gray level at the front view of the LCD device, and reference numerals 2 and 3 indicate transmittances with respect to gray level at the side view of the LCD device. Here, reference numeral 2 indicates an LCD device according to a comparative example, and reference numeral 3 indicates an LCD device according to an exemplary embodiment.

Table 3 below shows the transmittance and GDI of each of the LCD device 3 according to the exemplary embodiment and the LCD device 2 according to the comparative example.

TABLE 3

| | Embodiment (FIG. 19) | Comparative example |
|---|---|---|
| Transmittance (%) | 95 | 100 |
| Visibility index (GDI) | 0.384 | 0.444 |

Referring to Table 3 and FIG. 20, the LCD device 3 according to the exemplary embodiment of FIG. 19 is not greatly different in transmittance from the LCD device 2 according to the comparative example but has a lower visibility index than the LCD device 2 according to the comparative example. Therefore, the LCD device 3 according to the exemplary embodiment has improved lateral visibility.

Since the horizontal widths ws1 of the first through fourth slit portions SLT11 through SLT41 are smaller than the vertical widths ws2 of the first through fourth slit portions SLT11 through SLT41, a strong electric field can be provided in the first direction d1 and in the direction opposite to the first direction d1. As a result, lateral visibility at a low gray level can be improved.

Although not illustrated in the drawings, the pixel PX illustrated in FIG. 1 can be applied to a pixel displaying a blue color in an exemplary embodiment. However, the pixel PX illustrated in FIG. 1 can also be applied to a pixel displaying green or red colors.

According to embodiments of the inventive concept, a reduction in aperture ratio can be effectively minimized.

In addition, lateral visibility can be improved.

Furthermore, a reduction in transmittance at a high gray level can be effectively minimized.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display (LCD) device comprising:
a first substrate;
a pixel electrode which is disposed on the first substrate and comprises a first sub-pixel electrode and a second sub-pixel electrode adjacent to the first sub-pixel electrode along a first direction; and
a shielding electrode which is disposed on the same layer as the pixel electrode and comprises a first area having a first width and a second area having a second width which is smaller than the first width along a second direction which crosses the first direction,
wherein the first sub-pixel electrode is adjacent to the first area of the shielding electrode along the second direction, and the second sub-pixel electrode is adjacent to the second area of the shielding electrode along the second direction.

2. The LCD device of claim 1, further comprising:
a second substrate which faces the first substrate; and
a black matrix which is disposed on the second substrate,
wherein the black matrix does not overlap the first sub-pixel electrode and overlaps at least part of the second sub-pixel electrode in a direction perpendicular to a major surface plane defining the first substrate.

3. The LCD device of claim 2, further comprising:
a first spacing area which is disposed between the first sub-pixel electrode and the first area of the shielding electrode; and
a second spacing area which is disposed between the second sub-pixel electrode and the second area of the shielding electrode,
wherein the black matrix completely overlaps the second spacing area in the direction perpendicular to the major surface plane defining the first substrate.

4. The LCD device of claim 3, wherein the black matrix does not overlap the first spacing area in the direction perpendicular to the major surface plane defining the first substrate.

5. The LCD device of claim 3, further comprising a plurality of liquid crystal molecules which are disposed in the second spacing area, wherein the liquid crystal molecules completely overlap the black matrix in the direction perpendicular to the major surface plane defining the first substrate.

6. The LCD device of claim 1, wherein the area of the first sub-pixel electrode is smaller than that of the second sub-pixel electrode.

7. The LCD device of claim 1, wherein each of the first sub-pixel electrode and the second sub-pixel electrode has a vertical length parallel to the second direction, wherein the vertical length of the first sub-pixel electrode is smaller than that of the second sub-pixel electrode.

8. The LCD device of claim 1, wherein each of the first sub-pixel electrode and the second sub-pixel electrode has a horizontal length parallel to the first direction, wherein the horizontal length of the first sub-pixel electrode is smaller than that of the second sub-pixel electrode.

9. The LCD device of claim 1, further comprising a common electrode which defines a first slit portion overlapping the first sub-pixel electrode in the direction perpendicular to the major surface plane defining first substrate and a second slit portion overlapping the second sub-pixel electrode in the direction perpendicular to the major surface plane defining the first substrate, wherein each of the first slit portion and the second slit portion is cross-shaped.

10. The LCD device of claim 9, wherein each of the first slit portion and the second slit portion has a vertical portion parallel to the second direction, wherein a vertical length of the vertical portion of the first slit portion is smaller than a vertical length of the vertical portion of the second slit portion in the second direction.

11. The LCD device of claim 9, wherein the first slit portion comprises a horizontal portion parallel to the first direction and a vertical portion parallel to the second direction, and the second slit portion comprises a horizontal portion parallel to the first direction and a vertical portion parallel to the second direction, wherein a width of the horizontal portion of the first slit portion in the second direction is narrower than a width of the vertical portion of the first slit portion in the first direction, and a width of the horizontal portion of the second slit portion in the second direction is narrower than a width of the vertical portion of the second slit portion in the first direction.

12. The LCD device of claim 1, further comprising:
a first scan line which extends in the first direction and overlaps the shielding electrode in the direction perpendicular to the major surface plane defining the first substrate; and
at least part of the second sub-pixel electrode overlaps the first scan line in the direction perpendicular to the major surface plane defining the first substrate.

13. A liquid crystal display (LCD) device comprising:
a first substrate;
a pixel electrode which is disposed on the first substrate and comprises a first sub-pixel electrode and a second sub-pixel electrode adjacent to the first sub-pixel electrode in a first direction;
a second substrate which faces the first substrate;
a black matrix which is disposed on the second substrate; and
a shielding electrode which is disposed on the same layer as the pixel electrode and comprises a first area having a first width and a second area having a second width which is smaller than the first width along a second direction which crosses the first direction, wherein the first sub-pixel electrode faces the first area of the shielding electrode along the second direction, and the second sub-pixel electrode faces the second area of the shielding electrode along the second direction,
wherein the black matrix does not overlap the first sub-pixel electrode and overlaps at least part of the second sub-pixel electrode in a direction perpendicular to a major surface plane defining the first substrate.

14. The LCD device of claim 13, further comprising:
a first spacing area which is disposed between the first sub-pixel electrode and the first area; and
a second spacing area which is disposed between the second sub-pixel electrode and the second area,
wherein the black matrix completely overlaps the second spacing area in the direction perpendicular to the major surface plane defining the first substrate.

15. The LCD device of claim 14, wherein the black matrix does not overlap the first spacing area in the direction perpendicular to the major surface plane defining the first substrate.

16. The LCD device of claim 14, further comprising a plurality of liquid crystal molecules which are located in the second spacing area, wherein the liquid crystal molecules completely overlap the black matrix in the direction perpendicular to the major surface plane defining the first substrate.

17. The LCD device of claim 13, wherein the area of the first sub-pixel electrode is smaller than that of the second sub-pixel electrode.

18. The LCD device of claim 13, wherein each of the first sub-pixel electrode and the second sub-pixel electrode has a vertical length parallel to a second direction which crosses the first direction, wherein the vertical length of the first sub-pixel electrode is smaller than that of the second sub-pixel electrode.

19. The LCD device of claim 13, further comprising a common electrode which defines a first slit portion overlapping the first sub-pixel electrode in the direction perpendicular to the major surface plane defining the first substrate and a second slit portion overlapping the second sub-pixel electrode in the direction perpendicular to the major surface plane defining the first substrate, wherein each of the first slit portion and the second slit portion has a vertical portion parallel to a second direction crossing the first direction, wherein the vertical length of the vertical portion of the first slit portion is smaller than a vertical length of the vertical portion of the second slit portion in the second direction.

* * * * *